US009307256B2

(12) United States Patent
Rose et al.

(10) Patent No.: US 9,307,256 B2
(45) Date of Patent: Apr. 5, 2016

(54) METHOD AND APPARATUS FOR SPATIALLY SCALABLE VIDEO COMPRESSION AND TRANSMISSION

(71) Applicant: THE REGENTS OF THE UNIVERSITY OF CALIFORNIA, Oakland, CA (US)

(72) Inventors: Kenneth Rose, Ojai, CA (US); Jingning Han, Santa Barbara, CA (US); Vinay Melkote, San Mateo, CA (US)

(73) Assignee: The Regents of the University of California, Oakland, CA (US)

( * ) Notice: Subject to any disclaimer, the term of this patent is extended or adjusted under 35 U.S.C. 154(b) by 254 days.

(21) Appl. No.: 14/160,405

(22) Filed: Jan. 21, 2014

(65) Prior Publication Data

US 2014/0205009 A1    Jul. 24, 2014

Related U.S. Application Data

(60) Provisional application No. 61/754,872, filed on Jan. 21, 2013, provisional application No. 61/927,794, filed on Jan. 15, 2014.

(51) Int. Cl.
*H04N 19/33* (2014.01)
*H04N 19/503* (2014.01)
*H04N 19/13* (2014.01)
*H04N 19/124* (2014.01)
*H04N 19/187* (2014.01)
*H04N 19/48* (2014.01)
(Continued)

(52) U.S. Cl.
CPC ............. *H04N 19/33* (2014.11); *H04N 19/124* (2014.11); *H04N 19/13* (2014.11); *H04N 19/187* (2014.11); *H04N 19/48* (2014.11); *H04N 19/503* (2014.11); *H04N 19/547* (2014.11); *H04N 19/59* (2014.11); *H04N 19/196* (2014.11); *H04N 19/61* (2014.11)

(58) Field of Classification Search
None
See application file for complete search history.

(56) References Cited

U.S. PATENT DOCUMENTS 6,731,811 B1    5/2004   Rose
2007/0230564 A1*  10/2007   Chen .............. H04N 21/234327
375/240.01

OTHER PUBLICATIONS

Marpe, D., et al., "Video Compression Using Nested Quadtree Structures, Leaf Merging, and Improved Techniques for Motion Representation and Entropy Coding", IEEE Transactions on Circuits and Systems for Video Technology, Dec. 2010, pp. 1676-1687, vol. 20, No. 12.

(Continued)

*Primary Examiner* — Dave Czekaj
*Assistant Examiner* — Nam Pham
(74) *Attorney, Agent, or Firm* — Gates & Cooper LLP

(57) ABSTRACT

A method and apparatus provide the ability to resample video frame into various resolutions, and to predict, quantize, and entropy code the video signal for spatially scalable compression and networking applications. The solution involves a unified re-sampling and estimation-theoretic prediction, quantization, and entropy coding framework, which by design is tailored to allow base layer coding information to be fully accessible and usable by enhancement layers; and for the enhancement layer to account for all available information from both layers for superior compression performance. Specialization may include specific techniques for coding and networking scenarios, where the potential of the unified resampling and estimation-theoretic framework is realized to considerably improve the overall system performance over existing schemes.

40 Claims, 12 Drawing Sheets

(51) Int. Cl.
H04N 19/547 (2014.01)
H04N 19/59 (2014.01)
H04N 19/61 (2014.01)
H04N 19/196 (2014.01)

(56) References Cited

OTHER PUBLICATIONS

Rose, K., et al., "Toward Optimality in Scalable Predictive Coding", IEEE Transactions on Image Processing, Jul. 2001, pp. 965-976, vol. 10, No. 7.

Hang, H-M., et al., "Source Model for Transform Video Coder and Its Application—Part I: Fundamental Theory", IEEE Transactions on Circuits and Systems for Video Technology, Apr. 1997, pp. 287-298, vol. 7, No. 2.

Segall, A., et al., "Resampling for Spatial Scalability", IEEE ICIP, Oct. 2006, pp. 181-184.

Schwarz, H., et al., "Overview of the Scalable Video Coding Extension of the H.264/AVC Standard", IEEE Transactions on Circuits and Systems for Video Technology, Sep. 2007, pp. 1103-1120, vol. 17, No. 9.

Han, J., et al., "Estimation-Theoretic Approach to Delayed Prediction in Scalable Video Coding", Proceedings of 2010 IEEE 17th International Conference on Image Processing, Sep. 26-29, 2010, pp. 1289-1292.

Zhang, R., et al., "Efficient Inter-Layer Motion Compensation for Spatially Scalable Video Coding", IEEE Transactions on Circuits and Systems for Video Technology, Oct. 2008, pp. 1325-1334, vol. 18, No. 10.

Han, J., et al., "A Unified Framework for Spectral Domain Prediction and End-to-End Distortion Estimation in Scalable Video Coding", 2011 18th IEEE International Conference on Image Processing, Sep. 2011, pp. 3221-3224.

Han, J., et al., "Approaching Optimality in Spatially Scalable Video Coding: From Resampling and Prediction to Quantization and Entropy Coding", IEEE ICIP, Sep. 2013, pp. 1797-1801.

Han, J., et al., "An Estimation—Theoretic Approach to Spatially Scalable Video Coding", IEEE ICASSP, Mar. 2012, pp. 817-820.

Wu, F., et al., "A Framework for Efficient Progressive Fine Granularity Scalable Video Coding", IEEE Transactions on Circuits and Systems for Video Technology, Mar. 2001, pp. 332-344, vol. 11, No. 3.

Han, J., et al., "An Estimation—Theoretic Framework for Spatially Scalable Video Coding with Delayed Prediction", Proceedings of 2012 IEEE 19th International Packet Video Workshop, May 10-11, 2012, pp. 167-172.

Segall, C.A., et al., "Spatial Scalability Within the H.264/AVC Scalable Video Coding Extension", IEEE Transactions on Circuits and Systems for Video Technology, Sep. 2007, vol. 17, No. 9.

www.webmproject.org/code/., as downloaded Oct. 20, 2014.

Tan, T.K,. et al., "A Frequency Scalable Coding Scheme Employing Pyramid and Subband Techniques", IEEE Transactions on Circuits and Systems for Video Technology, Apr. 1994, pp. 203-207, vol. 4, No. 2.

Lam, E.Y., et al., "A Mathematical Analysis of the DCT Coefficient Distributions for Images", IEEE Transactions on Image Processing, Oct. 2000, pp. 1661-1666, vol. 9, No. 10.

Schwarz, H., et al., "Constrained Inter-Layer Prediction for Single-Loop Decoding in Spatial Scalability", Proc. IEEE ICIP, Sep. 2005, pp. 870-873.

Sullivan, G., "Efficient Scalar Quantization of Exponential and Laplacian Random Variables", IEEE Transactions on Information Theory, Sep. 1996, pp. 1365-1374, vol. 42, No. 5.

Martucci, S.A., "Image Resizing in the Discrete Cosine Transform Domain", Proc. IEEE ICIP, Oct. 1995, pp. 244-247.

Li, X. et al., "Laplace Distribution Based Lagrangian Rate Distortion Optimization for Hybrid Video Coding", IEEE Transactions on Circuits and Systems for Video Technology, Feb. 2009, pp. 193-205, vol. 19, No. 2.

* cited by examiner

METHOD AND APPARATUS FOR SPATIALLY SCALABLE VIDEO COMPRESSION AND TRANSMISSION

CROSS-REFERENCE TO RELATED APPLICATIONS

This application claims the benefit under 35 U.S.C. Section 119(e) of the following and commonly-assigned U.S. provisional patent applications, which are incorporated by reference herein:

U.S. Provisional Patent Application Ser. No. 61/754,872, filed on Jan. 21, 2013, by Kenneth Rose, Jingning Han, and Vinay Melkote, entitled "METHOD AND APPARATUS FOR RESAMPLING AND PREDICTION IN SPATIALLY SCALABLE VIDEO COMPRESSION AND COMMUNICATION"; and U.S. Provisional Patent Application Ser. No. 61/927,794, filed on Jan. 15, 2014, by Kenneth Rose, Jingning Han, and Vinay Melkote, entitled "METHOD AND APPARATUS FOR RESAMPLING AND PREDICTION IN SPATIALLY SCALABLE VIDEO COMPRESSION AND COMMUNICATION,".

BACKGROUND OF THE INVENTION

1. Field of the Invention

This invention relates to a method and apparatus for spatially scalable video compression and communication. The coding modules of scalable video compression impacted by this invention include resampling, prediction, quantization, and entropy coding.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Scalable Video Coding (SVC) is an important technology extending the capabilities of video compression systems and standards. For example, it is the focus of the Annex G extension of the H.264/MPEG-4 AVC video compression standard. In SVC, a video sequence is encoded into a single bit-stream comprised of multiple layers with progressively higher spatial (screen size), temporal (frame rate), or quality (signal-to-noise or SNR) resolutions:

Spatial (display resolution/definition) scalability: video is coded at multiple spatial resolutions. The data and reconstructed samples of lower resolution layers can be used to predict data or samples at higher resolutions, in order to reduce the incremental bit rate needed to code the higher resolution layers.

Temporal (frame rate) scalability: the motion compensation dependencies are structured so that complete frames (i.e., the corresponding packets) can be dropped from the bitstream.

Quality (SNR) scalability: video may be coded at a single spatial resolution but at different levels of reconstruction quality. The data and reconstructed samples of lower quality layers can be used to predict data or samples at higher qualities, in order to reduce the incremental bit rate needed to code the higher quality layers.

The higher resolution layers will typically benefit from differential coding from lower layers, via inter-layer prediction, which results in significant bit-rate reduction as well as enhanced streaming flexibility, without retaining multiple independent bit-streams, each of a different spatial, temporal or quality resolution. Thus, SVC is an attractive solution for multimedia streaming and storage in modern network infrastructures serving decoders of diverse display resolutions and channel capacities [1].

To better appreciate the shortcomings of the state-of-the-art, some relevant background information regarding prior art in compression and networking technologies and, in particular, scalable video compression technology, is provided.

As described above, a wide range of multimedia applications such as handheld playback devices, internet radio and television, online media streaming, gaming, and high fidelity teleconferencing heavily rely on advances in video compression. Their success and proliferation have greatly benefited from current video coders, including the H.264/AVC standard.

H.264/AVC

H.264/AVC is a video compression codec that is widely deployed in today's market. It divides every frame into a grid of rectangular blocks, whose sizes vary from 4×4 to 16×16. Each block can be predicted either from previously reconstructed boundary pixels of the same frame (intra-frame mode), or from pixel blocks of previously reconstructed prior frames (inter-frame mode). The prediction error (or residual) block undergoes spatial transformation by the discrete cosine transform (DCT) to output a block of transform coefficients, which are then quantized. The quantization indices are entropy coded for transmission. A common entropy coder, called context-based adaptive binary arithmetic coding, employs an adaptive probability model, conditioned on block size, prediction mode, and the spatially neighboring quantization indexes, to compress the current block quantization indexes.

H.264/AVC Scalable Video Coding Extension (H.264/SVC)

Scalable Video Coding (SVC) is an important technology extending the capabilities of video compression systems and standards. For example, it is the focus of the Annex G extension of the H.264/MPEG-4 AVC video compression standard. In SVC, a video sequence is encoded into a single bit-stream comprised of multiple layers with progressively higher spatial (screen size), temporal (frame rate), or quality (signal-to-noise or SNR) resolutions.

A spatial SVC scheme comprises downsampling a high resolution video sequence to a lower resolution, and coding the two resolutions into separate layers. The lower resolution signal is coded into a base layer via regular H.264/AVC standard codec, while the enhancement layer encodes information necessary to reconstruct the sequence at a higher spatial resolution than the base layer. At the enhancement layer, the current video frame can be predicted from a combination of its reconstruction at the base layer, and a motion compensated reference from prior enhancement layer coded frames. For instance, in the multi-loop design [14], employed in a variety of existing codecs, the prediction mode is selected amongst the two sources such that the rate-distortion cost is minimized. More details on existing spatial SVC approaches are provided in [2]. Note that the encoder effectively subsumes a decoder to generate the reconstructions of the base layer and prior enhancement layer frames. Therefore, once the bitstream is received, a decoder can generate the same prediction, given the already computed encoding decisions transmitted in the bitstream, and using the same reconstructions of the base layer and prior frames as were used by the encoder.

Single-Loop Prediction in H.264/SVC Standard

The standard SVC coder spatially downsamples the original input sequence, and the resultant lower dimension frames are coded by a standard single-layer codec into the base layer. The choice of the down-sampler is not part of the standard, and commonly employed strategies include, for example, the windowed sinc filter and pixel decimation. The enhancement layer prediction of the standard codec follows the single-loop design [2], where the prediction modes include inter-frame motion compensation, a sum of the motion-compensated reference and the upsampled reconstructions of base layer residual, or only the upsampled base layer reconstructions (when it is intra-coded). The encoder selects, per block, amongst all the possible modes the one that minimizes the rate-distortion cost.

An illustration of the process is provided by FIG. 2, which shows the enhancement layer 201 and base layer 202 of frame n−1 203 and frame n 204. To encode block 213 at the enhancement layer 201, the coder performs motion search from previously reconstructed frames in the same layer to generate a motion-compensated reference block 211. It then calculates the position of the base layer block 214 obtained by downsampling the region 212. A separable four-tap polyphase interpolation filter 221, in conjunction with the deblocking operation, is employed in the standard to upsample the base layer reconstruction of 214 to a block 215 at the same spatial dimension as 212. The subblock 216 in the resultant interpolation is collocated with block 213. Either block 211 or block 216 could be used as the enhancement layer prediction, and both are tested by the encoder to find the one that minimizes the rate-distortion cost. Here, for the purpose of illustration, we have implicitly assumed that the base layer block 214 is intra-coded. If block 214 was instead inter-coded, the decoded residuals for the block would be interpolated and summed up with reference block 211 to obtain yet another optional prediction for block 213. A more detailed reference on the single-loop design can be found in [2].

Multi-Loop Prediction in SVC

Another popular alternative is the multi-loop design where, in addition to the modes available in the single-loop design, the base layer reconstructed pixels could be used for enhancement layer prediction even when the base layer block is inter-coded. In other words, the multi-loop design requires full reconstruction of the base layer at the decoder, while the single-loop design could forgo various base layer operations if only the enhancement layer reconstruction is desired. In [4] a variant of the multi-loop design was proposed where enhancement layer prediction employs one of the following modes:

Inter-frame prediction from a motion compensated enhancement layer reference;

Intra-frame prediction from spatially neighboring reconstructed pixels;

Pyramid prediction, or subband prediction (a linear combination of the high-pass filtered motion-compensated enhancement layer reference and the upsampled base layer reconstruction). Effectively, the subband prediction mode uses the base layer reconstruction as prediction for low frequency transform coefficients, and the motion-compensated enhancement layer reference as prediction for high frequency transform coefficients.

The approach in [4] is reported to provide notable gains over single-loop prediction. In both approaches, multi-loop prediction and single-loop prediction, encoding decisions such as the prediction mode (inter-frame, pyramid prediction, etc.) are transmitted in the bitstream, and a decoder generates the same enhancement layer prediction as the encoder by combining or selecting reconstructions in the same way it was done by the encoder.

Details regarding the prediction tools in the H.264/SVC standard and other leading competitors are described in further detail in the provisional applications cross referenced above and incorporated by reference herein. Note that none of the above described prediction schemes in SVC fully utilize all the information available for enhancement layer prediction. For instance, these prediction modes do not exploit information available from the base layer due to the workings of its quantization operation, which determine an interval where the transform coefficient must lie. This interval information encapsulates all base layer information on the transform coefficient, and hence all the information made available by the base layer for enhancement layer prediction. Note, in particular, that downsampling, upsampling, and prediction are performed in the pixel domain, thus precluding any attempt to optimally utilize such interval information, which is only accessible in the transform domain.

SUMMARY OF THE INVENTION

The present invention provides a method and apparatus for spatially scalable video compression and communication. Specifically, the present invention focuses on prediction optimality in spatially scalable video coding. It further provides a framework that jointly optimizes the prediction, quantization, and entropy coding modules in spatially scalable video coding for additional compression performance gains.

The present invention draws inspiration from an estimation-theoretic prediction framework for quality (SNR) scalability earlier developed at the inventors' research lab [5], which achieved optimality in that setting by fully accounting for relevant information from the current base layer (e.g., intervals determined by the quantization performed at the base layer) and from the enhancement layer, to efficiently calculate the conditional expectation that forms the optimal predictor. It was central to that approach that all layers reconstruct approximations to the same original signal.

In spatial scalability, however, the layers encode different resolution versions of the original signal, which are hence not the same signal. To approach optimality in enhancement layer prediction, the present invention departs from current spatially scalable codecs that employ pixel domain resampling to perform inter-layer prediction. Instead, it incorporates a transform domain resampling technique that ensures that the base layer information is accessible and usable at the enhancement layer, despite their differing signal resolutions, which, in conjunction with prior enhancement layer information, enable optimal prediction.

A delayed prediction approach that complements this framework for spatial scalable video coding is then provided to further exploit future base layer frames for additional enhancement layer coding performance gains. A low-complexity embodiment of performs switched prediction that approximates the full optimal prediction, but only involves comparison, addition and scaling operations, while retaining major performance gains. Simulations provided experimental evidence that the proposed approaches substantially outperform the standard scalable video codec and other leading competitors.

Aided with the above transform domain resampling technique, an objective of this invention is to achieve an estimation-theoretic (ET) coding scheme that utilizes a probability distribution conditioned on all available information from the base layer and the enhancement layer motion-compensated reference, to jointly optimize the prediction, quantization, and entropy coding modules.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention is concerned with spatially scalable video codecs, which are central to video communications on heterogeneous networks and to diverse devices. It enables a considerably improved SVC system based on a unified framework for resampling and estimation-theoretic operation, which specifically achieves near-optimal enhancement layer coding performance in the transform domain.

The first component of the present invention involves the resampling of the signal in the transform domain, in a way that makes important base layer information fully available and usable to the enhancement layer despite their differing signal resolution. The present invention also provides means to fully exploit such additional information at enhancement layers to significantly improve the overall quality of the reconstructed signal at a given transmission rate, or equivalently, maintain the same signal quality at significantly reduced bit rates. Such capabilities are critical in video streaming applications involving end devices that vary in their display resolution as well as communication link capacities, and are hence of considerable importance to content providers, multimedia player device manufacturers, smart phones and tablets, networking industry, etc.

A second component of the present invention provides means for delayed prediction at enhancement layers processed, which complements the above paradigm for transform domain resampling and optimal utilization at the enhancement layer of base layer information from the current frame, by also accounting for base layer coding information of future frames. It thus exploits the availability of one or more future base layer frames when the enhancement layer is encoded (and decoded), a feasible and useful option in scalable communications, so as to achieve additional substantial performance gains, which would impact the above mentioned high-tech industries.

A third component of the present invention generalizes the above unified framework to incorporate not only the prediction, but also the quantization, and entropy coding modules. It provides means to fully utilize all the available information, in the form of a conditional probability density function per transform coefficient, which is used to adaptively design an entropy-constrained optimal predictive quantizer, and its matching adaptive entropy coder, for further performance improvement.

Detailed Technical Description

Figure 1:
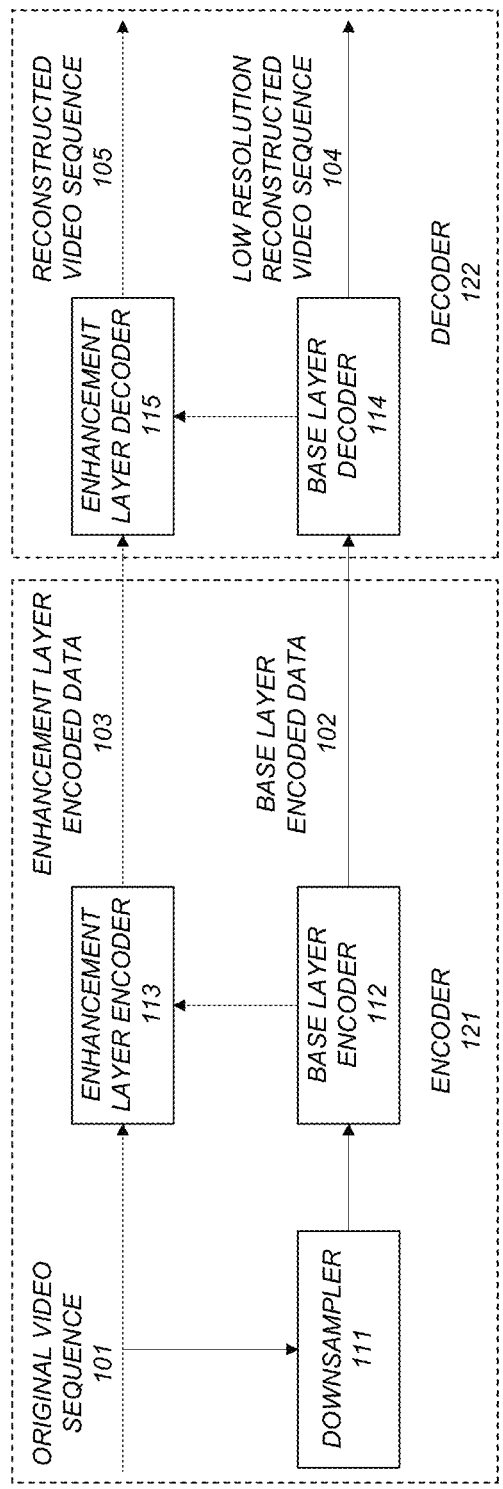
FIG. 1 is a schematic diagram illustrating an exemplary embodiment of a spatially scalable video coding/decoding (codec) system that can be used for transmission/reception or storage/retrieval of a video data stream according to one embodiment of the present invention.
Figure 2:
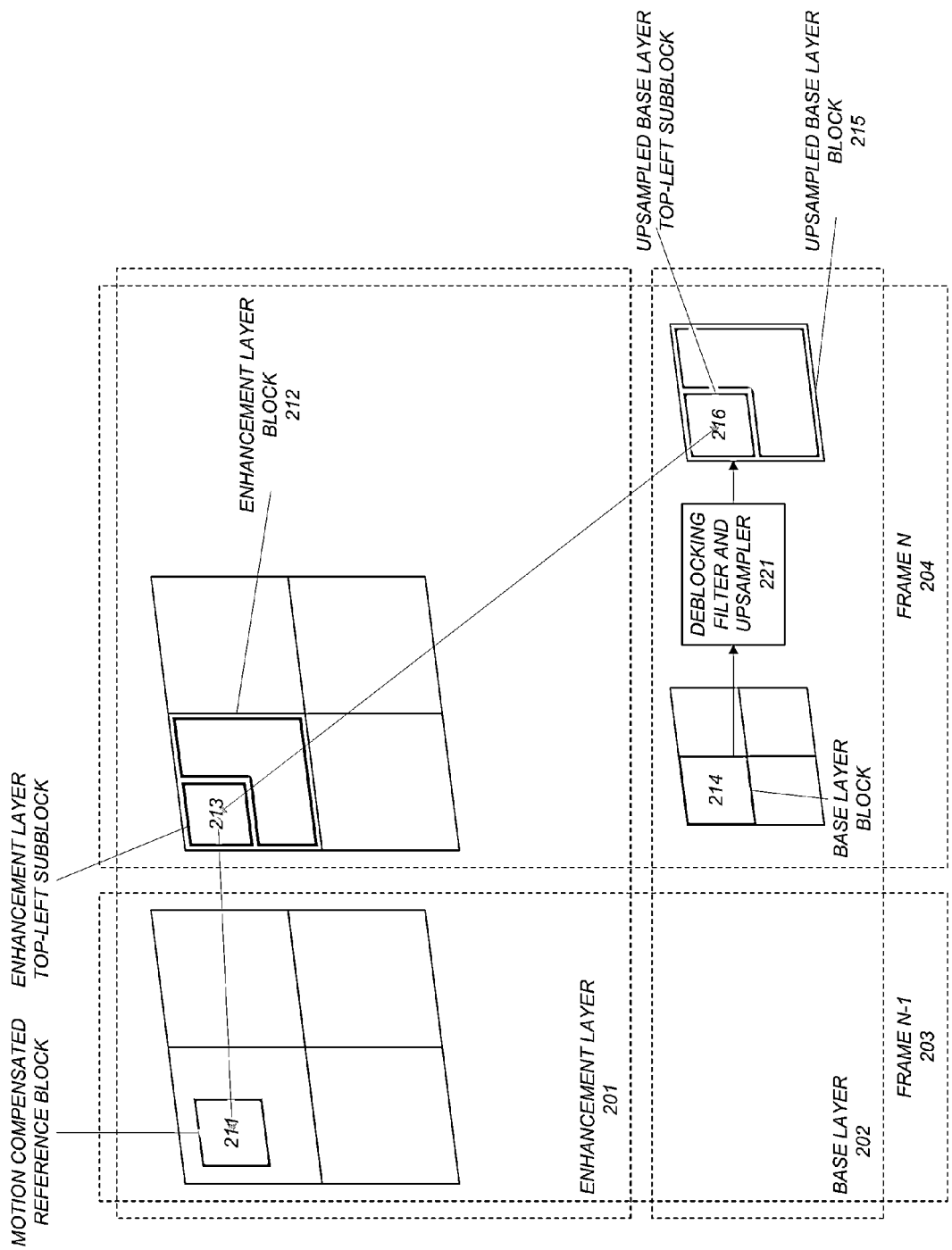
FIG. 2 illustrates a prediction scheme of a spatially scalable video compression system using conventional pixel domain operations.

FIG. 1 illustrates an example of typical spatially scalable video compression system. A spatially scalable video compression system is comprised of an encoder 121 and a decoder 122. The encoder 121 is comprised of a downsampling stage 111, base layer coding system 112, and one or more enhancement layer coding systems 113. A frame of the input video sequence 101 will first undergo a downsampling stage 111 to generate one or more lower resolution representations, each encoded by the corresponding layer encoder. An SVC encoder typically starts encoding at the lowest resolution layer 112 and then provides progressive refinements for higher resolution layers 113. The decoder 122 is comprised of a base layer decoder 114 and one or more enhancement layer decoders 115. An SVC decoder typically starts decoding at the lowest resolution layer 114 and then provides progressively finer reconstruction of the video sequence as it decodes enhancement layer data. At the lowest resolution layer, the SVC typically employs a standard single layer codec, for example, H.264/AVC. Alternatively, the lower resolution layer itself may have been encoded by a second instance of the SVC encoder, which further splits the lower resolution layer into more layers, so that the overall bitstream has more than two layers. Correspondingly, the terms base layer and enhancement layer in the following discussion and in claims refer to any two consecutive layers in the spatially scalable bitstream, where the lower resolution layer is called the base layer (which may itself be encoded into one or more layers) and the higher resolution layer is called the enhancement layer.

Consider two consecutive layers, comprising the lower resolution layer, named the base layer 102 and the higher resolution layer, named enhancement layer 103. The base layer encoder 112 uses the lower resolution frame as its input, generates prediction from previous coding information, subtracts the prediction from the input signal to generate the residuals. The residual signals are then spatially transformed and the resulting coefficients are quantized into indexes and entropy coded into a bitstream for transmission. The base layer decoder decodes the bitstream to generate the quantization indices and other base layer coding decisions, and generates the quantized residual coefficients. It repeats the same prediction procedure using previous coding information, as previously performed by the base layer encoder. It performs inverse transform of the decoded residual coefficients, and adds them to the prediction signals to reconstruct a representation of the lower resolution input frame.

The enhancement layer encoder 113 uses the higher resolution frame as its input. It generates prediction from reconstruction information of previous frames in the same layer and the current frame at the base layer, subtracts the prediction from the input signal to generate the residuals. The residual signals are then spatially transformed and the resulting coefficients are quantized into indexes and entropy coded into a bitstream for transmission. The enhancement layer decoder decodes the bitstream to generate the quantization indexes, hence obtaining the quantized coefficients. It repeats the same prediction procedure using previous coding information as the enhancement layer encoder 113, performs inverse transform of the decoded coefficients, and adds them to the prediction signals to rebuild a representation of the higher resolution input frame.

A preferred embodiment of the present invention comprises a unified resampling and estimation-theoretic enhancement layer coding framework that comprises A downsampling (and corresponding upsampling) approach that maximally preserves the information of original signal in its lower resolution representation, and allows efficient utilization of base layer coding information, including prediction and quantization indexes, by the subsequent enhancement layer for improved compression performance.

An estimation-theoretic coding approach for enhancement layer compression that optimally combines base layer coding information and the motion compensated reference of the same layer.

As discussed earlier, the related prior art of SVC coding typically operates in the pixel domain. It attempts to minimize the enhancement layer rate-distortion cost by switching between base layer reconstructed pixels, enhancement layer motion compensated pixels, and/or their linear combination. It ignores the fact that the quantization process is performed in the transform domain and is a highly non-linear operation, i.e., such information is not available in pixel domain, and hence is not able to fully utilize information from both layer.

Embodiments of the present invention eliminate such deficiencies in the prior art by performing downsampling and enhancement layer prediction all directly in the transform domain, while optimally exploiting all the available information including base layer quantization information.

Transform Domain Downsampling

Figure 3:
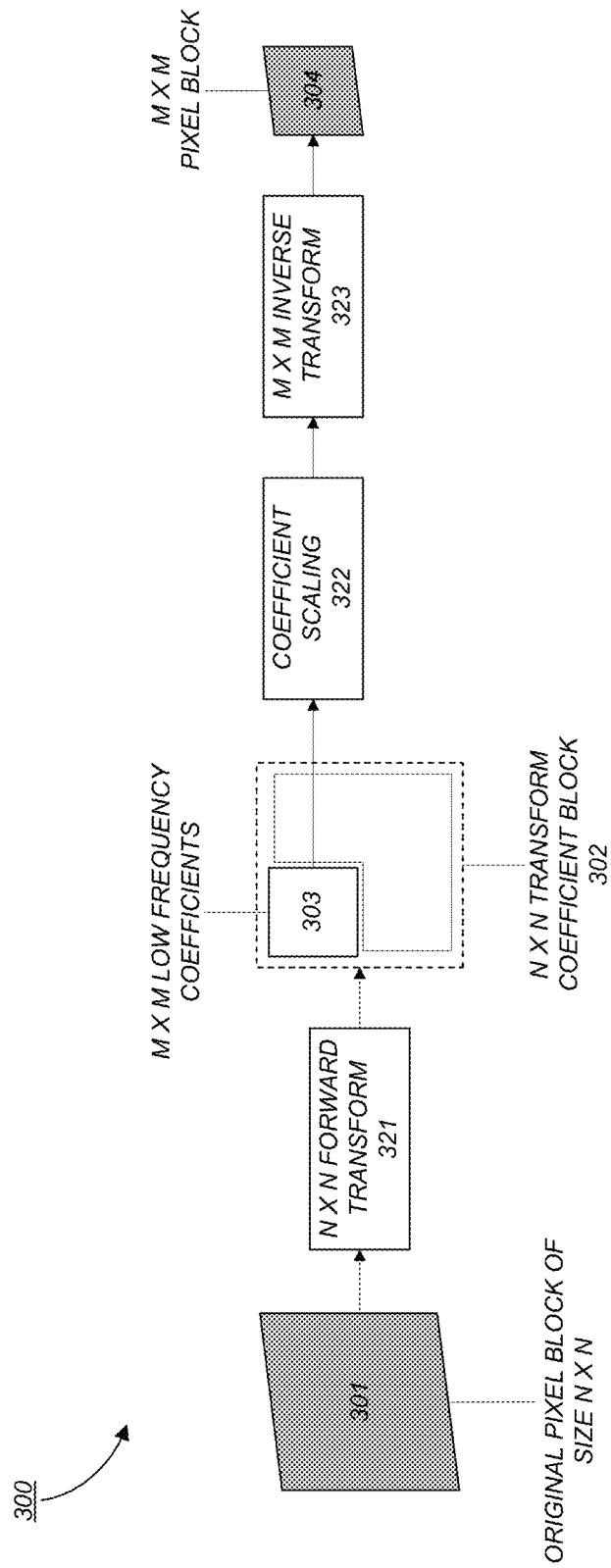
FIG. 3 illustrates an example transform domain downsampling process in accordance with one or more embodiments of the present invention.

The present invention comprises a transform-domain downsampling (and upsampling) approach that yields a low resolution base layer representation from selected transform coefficients. FIG. 3 illustrates an example transform domain downsampling system 300. The input pixel block 301 is of size N×N, where N is a positive integer. A forward N×N transform 321 is applied to the pixel block 301 to generate a transform coefficient block 302. The M×M (M is a positive integer and is less than N) low frequency coefficients block 303 of block 302 then undergoes a scaling process 322 and an inverse M×M transform process 323, to generate an M×M pixel block 304.

Let $x(i, j)$ denote the transform coefficient at frequency $(i, j)$ in block 303, where $i, j \in \{0, \ldots, M-1\}$. The scaling process 322 calculates the output transform coefficient at frequency $(i, j)$, denoted by $y(i, j)$, which is scaled, for example, as follows:

$$y(i, j) = \frac{M}{N} x(i, j) \tag{1}$$

Estimation-Theoretic Enhancement Layer Prediction

A preferred embodiment of the present invention comprises an estimation-theoretic enhancement layer prediction approach that combines all the available information for improved enhancement layer compression performance.

Figure 4:
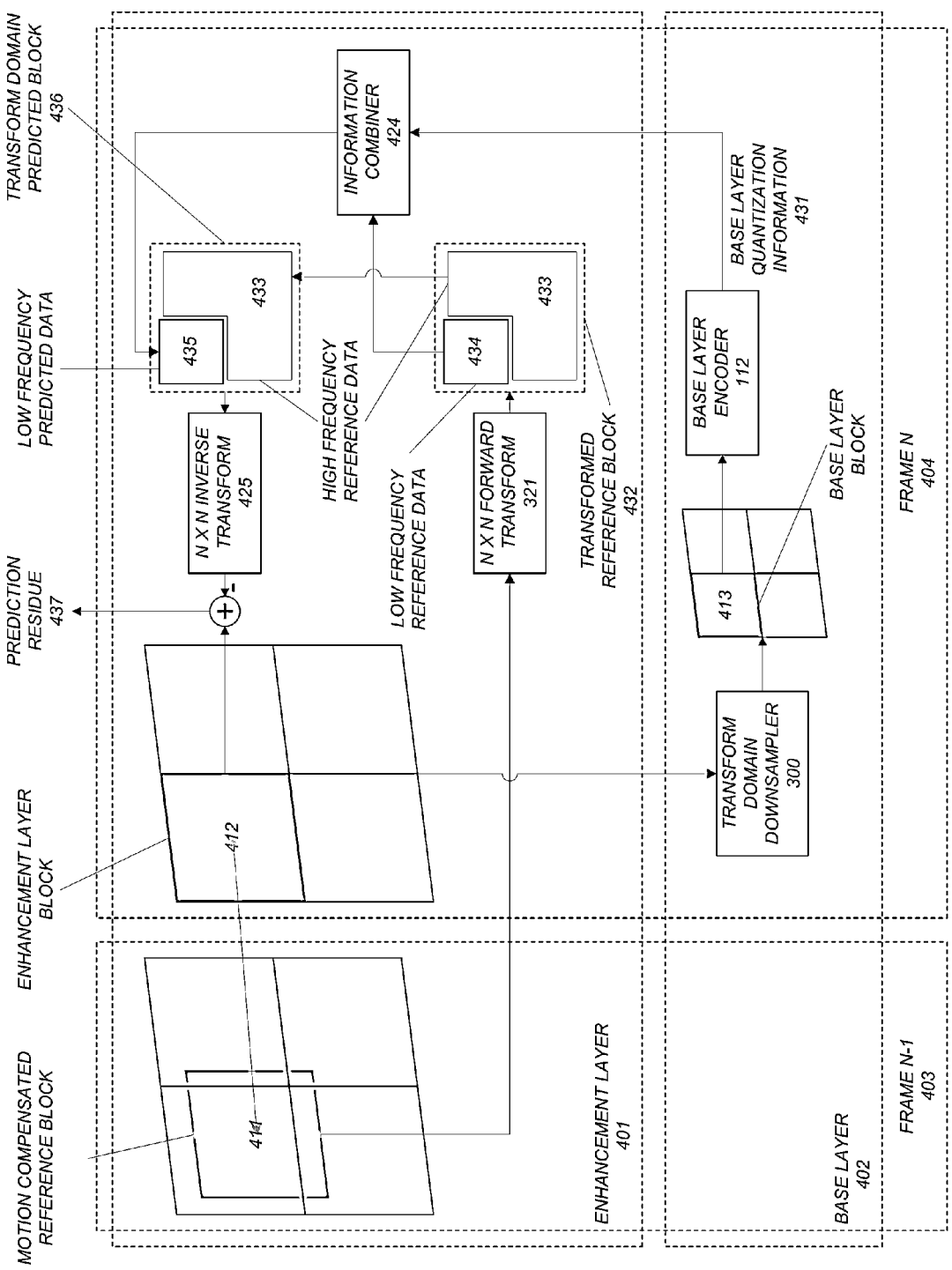
FIG. 4 illustrates an example encoder of a spatially scalable video compression system using the unified resampling and estimation-theoretic prediction with enhancement layer coding delay framework in accordance with one or more embodiments of the present invention.

FIG. 4 illustrates an example system of estimation-theoretic prediction approach in accordance with one or more embodiments of the present invention, which shows the enhancement layer 401 and base layer 402 of frame n−1 403 and frame n 404. An enhancement layer block 412 is downsampled by transform domain downsampler 300 to the collocated base layer block 413. Let $x_n^e(i, j)$, where $i, j \in \{0, \ldots, N-1\}$, denote the value of the transform coefficient at frequency $(i, j)$ obtained by applying a forward N×N transform 321 to enhancement layer block 412.

Block 413 is coded by the base layer encoder 112. Let $x_n^b(i, j)$, where $i, j \in \{0, \ldots, M-1\}$, denote the transform coefficients of the base layer block 413. The base layer prediction and quantization process essentially prescribes an interval $1_n^b(i, j)$ that contains the true value of $x_n^b(i, j)$. This interval summarizes all the information 431 provided by the base layer about the transform coefficient $x_n^b(i, j)$, and is stored in the information combiner 424.

The enhancement layer runs block matching motion search for the current block 412 in the previously reconstructed frames of the same layer. The resulting reference block is marked as 411 in this example. An N×N forward transform 321 is applied to the reference block 411 to generate the transform coefficient block 432, which comprises a set of high frequency coefficients 433 and a set of low frequency coefficients 434. The low frequency coefficients are denoted by $x_{n-1}^e(i, j)$, where $i, j \in \{0, \ldots, M-1\}$, and are sent to the information combiner 424. Note that the motion search needs to be run only at the encoder. The motion vectors are typically transmitted in the bitstream, and are used by the decoder to directly determine the reference block.

Figure 5:
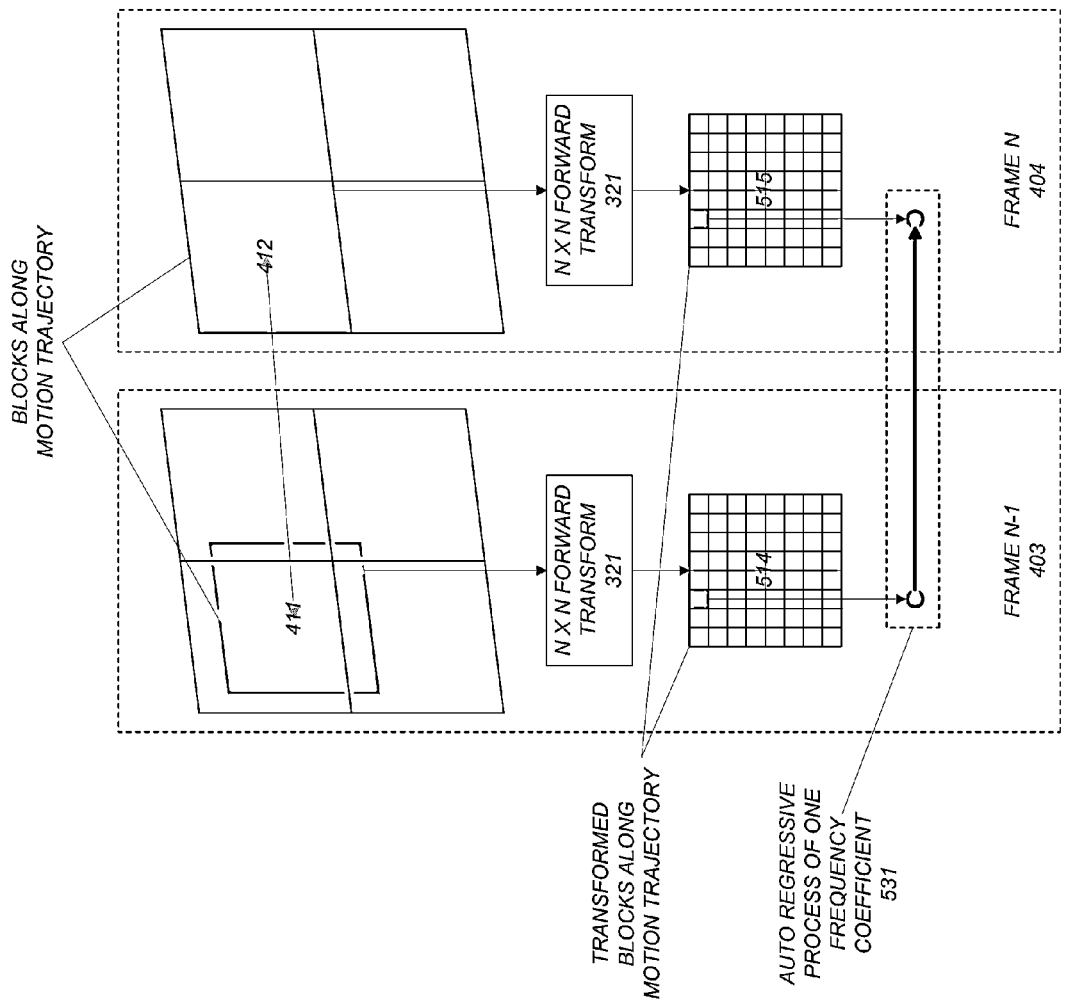
FIG. 5 illustrates a transform domain modeling in accordance with one or more embodiments of the present invention.

The information combiner 424 estimates the low frequency predicted data 435, conditioned on the reference coefficients 434 and base layer information 431. In order to combine the two types of information, the combiner employs an autoregressive (AR) process evolution model for transform coefficients of video blocks that lie along the same motion trajectory. This is illustrated in FIG. 5. Consider two video blocks 411, and 412 as shown in FIG. 5, that lie on the same motion trajectory, in frame n−1 403, and frame n 404, respectively. The spatial transform coefficients of these blocks are examined, which are indicated by blocks of transform coefficients, 514, and 515, respectively, obtained by applying the forward spatial transform 321. Consider the enhancement layer transform coefficient at a particular frequency (i, j) indicated by the gray square in 514, and 515, which can be referred to as $x_{n-1}^e(i, j)$, and $x_n^e(i, j)$, respectively. The evolution of this transform coefficient is then modeled by the AR process 531, where $x_{n-1}^e(i, j)$ evolves into $x_n^e(i, j)$, via the model:

$$x_n^e(i,j) = \rho x_{n-1}^e(i,j) + z_n(i,j) \tag{1A}$$

where $\{z_n(i, j)\}$ are modeled as independent and identically distributed random variables, referred to as the innovations of the process, the distribution being $p_Z(z)$. Here $\rho$ is the correlation coefficient between adjacent samples in the sequence $\{x_n^e(i, j)\}$. In some embodiments of the invention the correlation coefficient may be approximated with unity, i.e., $\rho \approx 1$. In other embodiments, the innovations may be modeled as being independent but not identically distributed, i.e., the distribution $p_Z(z)$ changes over time. Further the correlation coefficient need not be unity and may itself evolve over time. The probability distribution model $p_Z(z)$ 601 can be estimated from a training set and hard coded into the codec, or can be adaptively estimated on-the-fly, in different embodiments of the invention, and so also the correlation coefficient $\rho$. The correlation coefficient and probability distribution model may both change with frequency of the transform coefficient as well.

In some embodiments of the invention the transform coefficient of frequency (i, j) in block 514 may be approximated by its reconstruction $\hat{x}_{n-1}^e(i, j)$. This along with the approximation $\rho \approx 1$ leads to the probability distribution function of $x_n^e(i, j)$ conditioned on the motion-compensated reference $x_{n-1}^e(i, j)$ to be approximated by $$P(x_n^e(i,j)|\hat{x}_{n-1}^e(i,j)) = P_Z(x_n^e(i,j) - \hat{x}_{n-1}^e(i,j)). \tag{1B}$$

Figure 6:
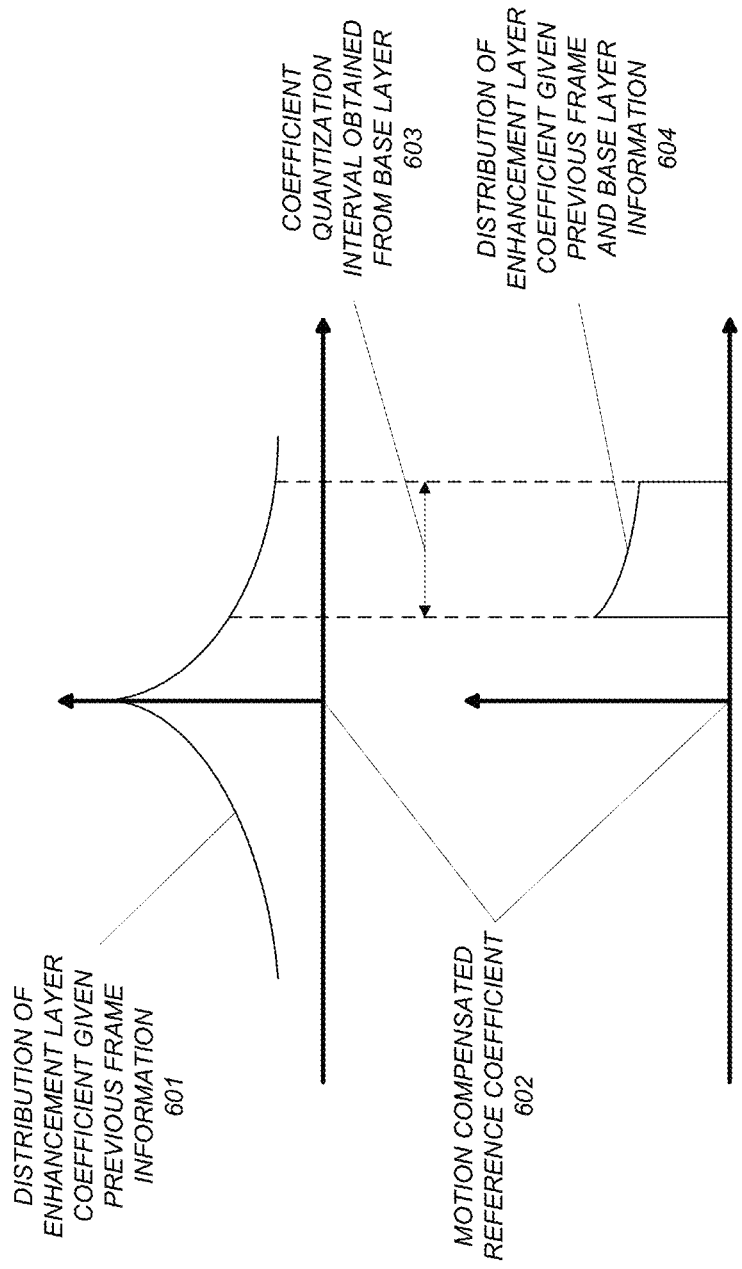
FIG. 6 illustrates an example scheme that combines both base layer coding information and enhancement layer motion-compensated reference to obtain the conditional probability distribution model in accordance with one or more embodiments of the present invention.

FIG. 6 illustrates an example of information combiner 424 in accordance with one or more embodiments of the present invention. The probability distribution model of enhancement layer transform coefficient 601 is shifted to be centered at the motion compensated reference coefficient $\hat{x}_{n-1}^e(i, j)$ 602, in accordance with (1B). The base layer prediction and quantization process effectively provides an interval 603 denoted by $$I_n^e(i, j) = \left\{ \frac{N}{M} x \,\middle|\, x \in I_n^b(i, j) \right\}, \; i, j \in \{0, \ldots, M-1\} \tag{2}$$

that contains the true value of the enhancement layer transform coefficient to be estimated. The information combiner 424 uses interval 603 to truncate the initial probability distribution model 601 and normalize it to the refined probability distribution model 604 denoted by:

$$p(x_n^e(i, j) | \hat{x}_{n-1}^e(i, j), I_n^e(i, j)) = \tag{3}$$

$$\begin{cases} \dfrac{pz(x_n^e(i, j) - \hat{x}_{n-1}^e(i, j))}{\int_{I_n^e(i,j)} pz(x_n^e - \hat{x}_{n-1}^e(i, j)) dx_n^e} & x_n^e(i, j) \in I_n^e(i, j), \\ 0 & \text{else.} \end{cases}$$

The prediction is formulated as the conditional expectation (or "center of mass") of this refined probability distribution model 604 by:

$$\bar{x}_n^e(i, j) = E\{x_n^e(i, j) | \hat{x}_{n-1}^e(i, j), I_n^b(i, j)\} \tag{4}$$

$$= \begin{cases} E\{x_n^e(i, j) | \hat{x}_{n-1}^e(i, j), I_n^e(i, j)\}, & i, j \in \{0, \ldots, M-1\}, \\ \hat{x}_{n-1}^e(i, j), & \text{else.} \end{cases}$$

The predicted low frequency coefficients 435 and reference high frequency coefficients 433 are concatenated to form the transform domain predicted block 436. An optional inverse N×N transform 425 can be applied to transform domain predicted block 436 to generate the pixel domain representation of the predicted block. The predicted block is then subtracted from input block 412 to generate a residual block 437, which undergoes transformation, quantization, and entropy coding.

Note that when block 413 is coded in a standard "skip" mode by the base layer coder 422, or the quantization information 431 suggests that all transform coefficients are quantized to zero, the information combiner 424 can discard the information from the base layer 431, and use motion-compensated reference 434 as output prediction 435. While the above embodiment of the invention uses scalar quantizers in the base layer, in other embodiments vector quantizers may be used in the base layer. Analogous to the scalar quantizer's partition of the real line into quantization intervals, such embodiments consider a partition of a higher-dimensional space, and a joint conditional distribution of transform coefficients over this partition, given motion compensation information, and the prediction is accordingly jointly formed for a vector of transform coefficients. A quantization index output by a vector quantizer identifies a cell in the partition and hence prescribes bounds on the value of the vector that was quantized to this particular index (just as a scalar quantizer bounds the value of a scalar to a quantization interval). Hence, a vector quantizer, when employed in the base layer will prescribe bounds on the value of a vector of transform coefficients.

Note that the prediction or optimal estimate in (4) is conditioned on reconstruction information (the reconstruction of prior enhancement layer frames and bounds on transform coefficients' values determined by the quantization performed at the base layer), both of which are available exactly at the decoder. One embodiment of the invention comprises a decoder that can use the same information combiner 424 to generate a prediction. In a preferred embodiment, this prediction is substantially the same as the prediction employed by a corresponding encoder that generated the encoded bitstream. The decoder may not need to compute information such as motion-vectors, or the prediction mode, which may all be transmitted within the bitstream.

Yet another embodiment of the invention comprises a decoder that generates a prediction using the information combiner 424, and employs it for error concealment, i.e., to conceal the effects of missing or corrupted encoded enhancement layer data, for example, due to packet loss in the network. The decoder of this embodiment enables enhanced resilience to loss in the network, even when a prior art encoder is in use, such as the H.264/SVC encoder.

In another embodiment of the invention, the information provided by the base layer is captured more generally by a probability distribution of the transform coefficient $x_n^e(i, j)$ conditioned on some raw base layer information, denoted by B. Let $p(x_n^e(i, j)|B)$ denote this probability distribution. Note that such distribution may not be limited to an interval. Then, the conditional probability distribution of $x_n^e(i, j)$ given both base layer information B and prior enhancement layer information may be approximated as:

$$p(x_n^e(i,j) \mid \hat{x}_{n-1}^e(i,j), B) \approx \frac{p_Z(x_n^e(i,j) - \hat{x}_{n-1}^e(i,j))p(x_n^e(i,j) \mid B)}{\int p_Z(x_n^e(i,j) - \hat{x}_{n-1}^e(i,j))p(x_n^e(i,j) \mid B)dx_n}.$$ (4A)

This type of formulation may be of utility in some embodiments of the invention where there may be no direct correspondence such as in (1) between the transform coefficients encoded in the base layer and those at the enhancement layer, for instance, when the resampling is executed in the pixel domain. The conditional distribution (4A) is then utilized to derive the optimal prediction as the corresponding conditional expectation of $x_n^e(i,j)$ given the available information from both the base and the enhancement layers.

Estimation-Theoretic Delayed Enhancement Layer Prediction

An important feature of scalable coding is that the base layer can be decoded independently of enhancement layers, which allows the enhancement layer decoder potential access to information about future base layer frames, at a given coding latency relative to the base layer. Embodiments of the present invention provide means to exploit such future information, in addition to the current base layer and prior enhancement layer information, in a scheme that complements the above unified resampling and estimation-theoretic prediction framework, to further refine the enhancement layer prediction, and thereby achieve considerable performance gains beyond those achieved by the non-delayed ET prediction.

Figure 7:
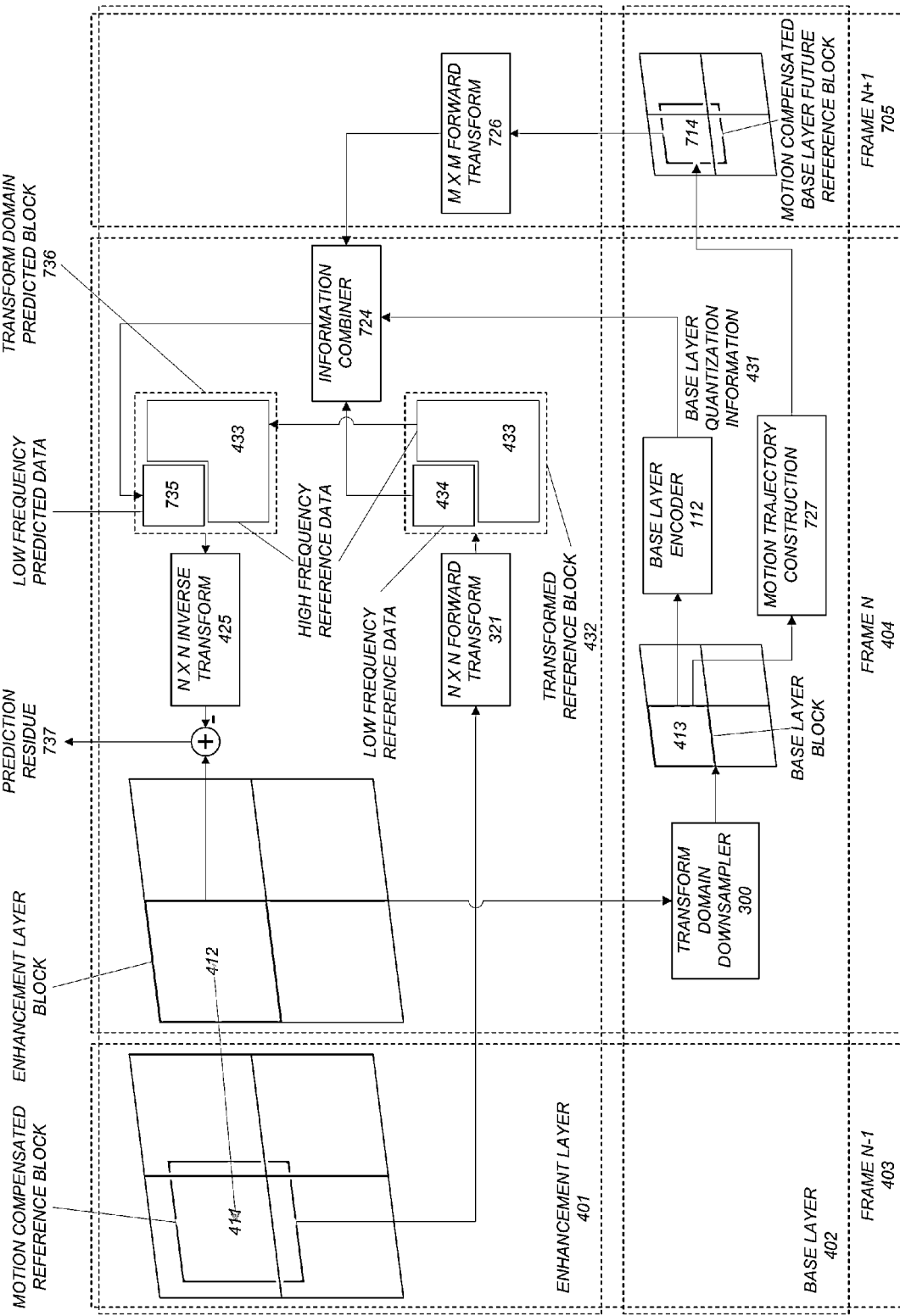
FIG. 7 illustrates an example encoder of a spatially scalable video compression system using the unified resampling and estimation-theoretic delayed prediction with enhancement layer coding delay framework in accordance with one or more embodiments of the present invention.

FIG. 7 illustrates system for estimation-theoretic delayed prediction in accordance with one or more embodiments of the present invention. An enhancement layer block 412 is downsampled by transform domain downsampler 300 to the collocated base layer block 413. Let $x_n^e(i,j)$, where $i,j \in \{0, \ldots, N-1\}$, denote the value of the transform coefficient at frequency $(i,j)$ obtained by applying a forward N×N transform 321 to enhancement layer block 412.

Block 413 is coded by the base layer encoder 112. Let $x_n^b(i,j)$, where $i,j \in \{0, \ldots, M-1\}$, denote the transform coefficients of the base layer block 413. The base layer prediction and quantization process 431 essentially prescribes an interval $l_n^b(i,j)$ that contains the true value of $x_n^b(i,j)$. This interval summarizes all the information 431 provided by the base layer about the transform coefficient $x_n^b(i,j)$, and is stored in the information combiner 724.

Similar downsampling and coding process is applied to the base layer coding of frame n+1, 705. A motion trajectory construction 727 is applied to block 413 to find a reference block 714 in base layer reconstruction of frame n+1 705. An M×M forward transform 726 is applied to block 714 and the resulting transform coefficients denoted by $\hat{x}_{n+1}^b(i,j)$, where $i,j \in \{0, \ldots, M-1\}$, are stored in information combiner 724.

Figure 8:
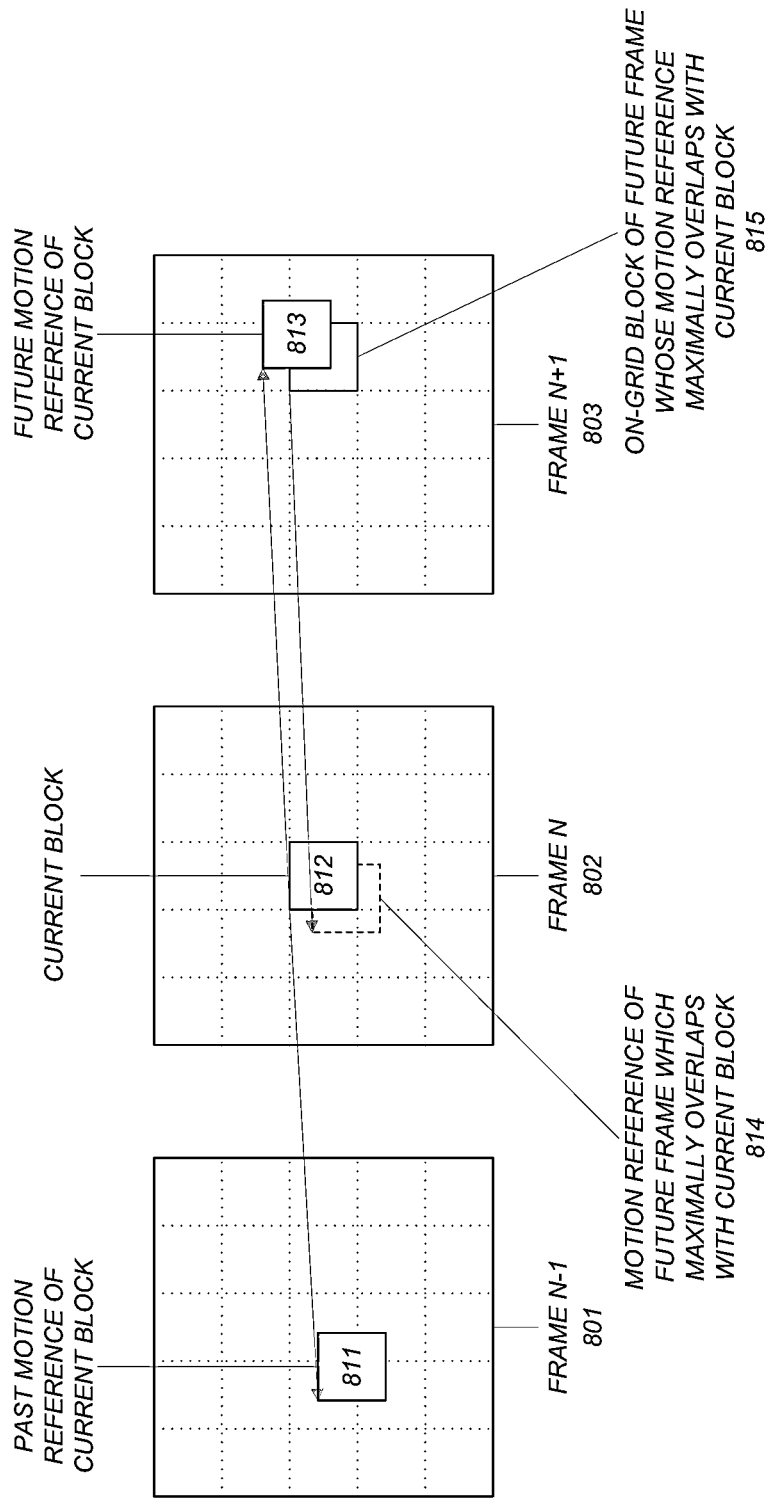
FIG. 8 illustrates an example motion trajectory construction process for the estimation-theoretic delayed prediction in accordance with one or more embodiments of the present invention.

The embodiments of the invention include means to properly construct a motion trajectory at modest system complexity. FIG. 8 illustrates an example system of motion trajectory construction 727. The motion trajectory that includes a current block 812 in frame n, 802, its past motion-compensated reference block 811 in frame n−1 801, and continued into future frame n+1 803 to arrive at future motion-compensated reference block 813. The motion trajectory can be constructed by running a block matching motion search for current block 812 in the reconstructed frame n+1 yielding block 813. Note that such delayed prediction requires the decoder to perform the same motion search in order to generate an enhancement layer prediction that is identical to the one used at the encoder, with certain implications on decoder complexity.

Another embodiment of the invention offers a lower complexity alternative that exploits the already available motion vector information for frame n+1, 803, whose on-grid blocks 815 are mapped back to their off-grid reference blocks in frame n, 814. The coder first identifies the locations of these reference blocks in frame n, 802, for all inter-frame coded blocks in frame n+1, 803. Then, for each on-grid block 812 in frame n, 802, the coder identifies the maximally overlapping reference block, reverses the associated motion vector to obtain a mapping of on-grid block 812, to its future reference block 813.

Other embodiments apply restrictions for enhanced stability of the above motion trajectory construction process. For example, one possible restriction could be that the overlap area between block 812 and the maximally overlapping (through motion compensation) reference block 814 must be greater than a prescribed threshold to justify assigning the corresponding inverse motion vector. In such embodiments, occasionally, block 812 will not be matched with any inverse motion compensated reference 813 in frame n+1 803.

The enhancement layer runs block matching motion search for the current block 412 in the previously reconstructed frames of the same layer. The resulting reference block is marked as 411 in this example. An N×N forward transform 321 is applied to the reference block 411 to generate the transform coefficient block 432, which comprises a set of high frequency coefficients 433 and a set of low frequency coefficients 434. The low frequency coefficients are denoted by $\hat{x}_{n-1}^e(i,j)$, where $i,j \in \{0, \ldots, M-1\}$, and are sent to the information combiner 724 Note that the motion search needs to be performed only at the encoder. The motion vectors are typically transmitted in the bitstream, and are available to the decoder to directly determine the reference block.

The information combiner 724 estimates the low frequency predicted data 735, conditioned on the enhancement layer reference coefficients 434, base layer information 431 of frame n 404, and the base layer reference coefficients 726 of frame n+1 705. The conditional probability density function of $x_n^e(i,j)$, where $i,j \in \{0, \ldots, N-1\}$ is given by $$p(x_n^e(i,j) \mid \hat{x}_{n-1}^e(i,j), I_n^e(i,j), \hat{x}_{n+1}^b(i,j)) \approx \frac{p(x_n^e \mid \hat{x}_{n-1}^e, I_n^e) \cdot p(\hat{x}_{n+1}^b \mid x_n^e)}{\int_{I_n^e} p(x_n^e \mid \hat{x}_{n-1}^e, I_n^e) \cdot p(\hat{x}_{n+1}^b \mid x_n^e) dx_n^e}$$

$$\approx \begin{cases} \dfrac{p_Z(x_n^e - \hat{x}_{n-1}^e) \cdot p_Z\left(\frac{N}{M}\hat{x}_{n+1}^b - x_n^e\right)}{\int_{I_n^e} p_Z(x_n^e - \hat{x}_{n-1}^e) \cdot p_Z\left(\frac{N}{M}\hat{x}_{n+1}^b - x_n^e\right) dx_n^e}, & x_n^e \in I_n^e, \\ 0, & \text{else.} \end{cases}$$ (5)

where the probability distribution model $p_Z(z)$ 601 can be estimated from training set and hard coded to the codec, or can be adaptively estimated on-the-fly. The estimate of $x_n^e(i, j)$, where $i, j \in \{0, \ldots, N-1\}$ 735 is hence formulated as the conditional expectation of (5):

$$\tilde{x}_n^e(i, j) = \qquad (6)$$
$$\begin{cases} E\{x_n^e(i, j) \mid \hat{x}_{n-1}^e(i, j), I_n^e(i, j), \hat{x}_{n+1(i,j)}^b\}, & i, j \in \{0, \ldots, M-1\}, \\ \hat{x}_{n-1}^e(i, j), & \text{else.} \end{cases}$$

The predicted low frequency coefficients 735 and reference high frequency coefficients 433 are concatenated to form the transform domain predicted block 736. An optional inverse N×N transform 425 can be applied to transform domain predicted block 736 to generate the pixel domain representation of the predicted block. The predicted block is then subtracted from input block 412 to generate a residual block 737, which undergoes regular variable block size transformation, quantization, and entropy coding stages.

Note that when the motion trajectory constructor 727 fails to match block 413 to any reference block in base layer reconstruction of frame n+1, 705, the information combiner 724 can discard reference coefficients 726 from frame n+1 and revert to the causal estimation-theoretic predictor 424.

Note that when block 413 is coded in "skip" mode by the base layer coder 422, or the quantization information 431 suggests that all transform coefficients are quantized to zero, the information combiner 724 will discard the information from base layer 431, and use motion-compensated reference 434 as output prediction 735.

Note that the prediction or optimal estimate in (6) is conditioned on reconstruction information (the reconstruction of prior enhancement layer frames, the future base layer frame(s) and the intervals bounding the values of coefficients as determined by the quantization performed at the base layer), all of which are available exactly at the decoder. One embodiment of the invention comprises a decoder that can use the same information combiner 724 to generate a prediction. In a preferred embodiment, this prediction is substantially the same as the prediction employed by a corresponding encoder that generated the bitstream processed by the decoder. The decoder may not need to compute information such as motion-vectors, or the prediction mode, which may be transmitted within the bitstream. The decoder may employ a process to invert motion vectors, for a fast motion search, to match blocks in the current frame with blocks in a future frame, where the process is substantially similar to the operation at the encoder as described above. Yet another embodiment of the invention comprises a decoder that generates a prediction using the information combiner 724, and employs it for error concealment, i.e., to conceal the effects of missing or corrupted encoded enhancement layer data, for example, due to packet loss in the network. The decoder of this embodiment enables enhanced resilience to loss in the network, even when a prior art encoder is in use, such as the H.264/SVC encoder.

Switched Predictor Enhancement Layer Prediction

Another embodiment of the present invention provides a low-complexity variant of the above estimation-theoretic prediction process. It employs a low-complexity approximation of the conditional expectations of (4) and (6), which only involves simple arithmetic, while largely retaining the enhancement layer coding performance gains. Depending on a motion compensated transform coefficient from a prior reconstructed frame at the enhancement layer, and on quantization information from the base layer, it switches between simple prediction prescriptions, which approximate the exact estimation-theoretic prediction as closely as possible.

Figure 9:
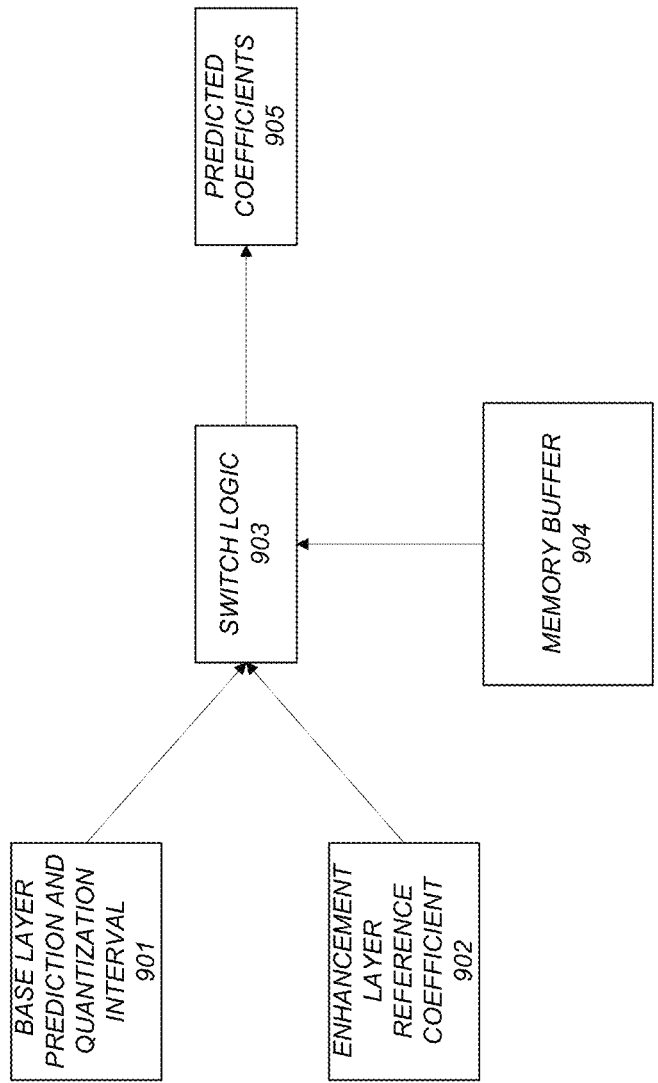
FIG. 9 illustrates an example switched prediction scheme that employs simple arithmetic operations for low-complexity implementation, while largely resembling the compression performance of the estimation-theoretic prediction scheme in accordance with one or more embodiments of the invention.

FIG. 9 illustrates an example embodiment for information combiner 424 implementing the switched predictor. The motion-compensate reference coefficient 902 denoted by $\hat{x}_{n-1}^e(i, j)$ is compared to the interval 901 determined by the base layer and denoted in equations by $I_n^e(i, j)$. Depending on the position of coefficient 902 relative to interval 901, the switch logic 903 will select either the motion-compensated reference, or the sum of an appropriate entry pre-calculated and stored in memory buffer 904 and a limit of interval 901, and output the result as the predicted coefficients 905 denoted $\tilde{x}_n^e$.

Denote the limits of the interval $I_n^e(i, j) = [a, b)$, and its size $\Delta = b - a$, which are determined by base layer prediction $\hat{x}_n^b$ and quantizer index $i_n^b$. According to one embodiment the switch logic 903 comprises the following three cases:

Case 1: $\hat{x}_{n-1}^e < a$ \qquad (7)

$$\tilde{x}_n^e = a + \frac{1}{\lambda} + \Delta \frac{e^{-\lambda\Delta}}{e^{-\lambda\Delta} - 1}$$

where $\lambda$ is the Laplacian model parameter for a coefficient of a given frequency. The term $$\frac{1}{\lambda} + \Delta \frac{e^{-\lambda\Delta}}{e^{-\lambda\Delta} - 1}$$

hence depends on frequency and on the quantizer structure. Its value can be pre-calculated and stored in the buffer 904.

Case 2: $\hat{x}_{n-1}^e > b$ \qquad (8)

$$\tilde{x}_n^e = a - \frac{1}{\lambda} + \Delta \frac{e^{\lambda\Delta}}{e^{\lambda\Delta} - 1}$$

The term $$-\frac{1}{\lambda} + \Delta \frac{e^{\lambda\Delta}}{e^{\lambda\Delta} - 1}$$

is a function of frequency and quantizer structure and can be pre-calculated and stored in the buffer 904.

Case 3: $a < \hat{x}_{n-1}^e < b$ $$\tilde{x}_n^e = \hat{x}_{n-1}^e \qquad (9)$$

Thus, conditioned on where the motion compensated value $\hat{x}_{n-1}^e$ falls relative to the interval $I_n^e$, the enhancement layer prediction module switches between the above three simple predictors. A similar approach simplifies the computation of (6).

Note that when block 413 is coded in skip mode in base layer coder 422, or the quantization information 431 suggests that all transform coefficients are coded as zero, the switched predictor will discard the information from base layer 431, and use motion-compensated reference 434 as output prediction 435. Note that the switched prediction of (7), (8), or (9) utilizes reconstruction information (the reconstruction of prior enhancement layer frames, and the intervals bounding the values of coefficients as determined by the quantization performed at the base layer), all of which are available exactly at the decoder. One embodiment of the invention comprises of a decoder that can use the same information combiner of FIG. 9 to generate a switched prediction. In a preferred embodiment, this prediction is substantially the same as the prediction employed by a corresponding encoder that generated the bitstream processed by the decoder. The decoder may not need to compute information such as motion-vectors, or the prediction mode, which may be transmitted within the bitstream. Yet another embodiment of the invention comprises a decoder that generates a prediction using the information combiner of FIG. 9, and employs it for error concealment, i.e., to conceal the effects of missing or corrupted encoded enhancement layer data, for example, due to packet loss in the network. The decoder of this embodiment enables enhanced resilience to loss in the network, even when a prior art encoder is in use, such as the H.264/SVC encoder.

Estimation-Theoretic Quantization and Entropy Coding

Other embodiments of the present invention include means to adaptively select the quantizer and entropy coder, by utilizing both base and enhancement layer information. This adaptation is performed in both encoder and decoder, and the selection determines the quantization and entropy encoding at the encoder, and correspondingly the entropy decoding and reconstruction at the decoder. A conventional SVC codec treats the prediction, quantization, and entropy coding processes as largely separate stages. It inherits a fixed structure "dead-zone" quantizer from a standard single layer codec, such as H.264/AVC, to quantize the prediction residuals in the transform domain. The resulting quantization indices are entropy coded by an entropy coder, also inherited from the single layer codec, which updates the probability model according to information from spatially neighboring blocks. However, such an approach ignores valuable information from the base layer and fails to fully achieve the potential of enhancement layer compression efficiency.

One or more embodiments of the present invention mitigate such shortcomings of conventional SVC codecs by employing an adaptive quantizer selection mechanism, depending on both base layer coding information and the enhancement layer motion-compensated reference, followed by an entropy coder whose probability model is adapted to each quantizer, accordingly. The adaptive quantizer selection mechanism complements the above unified resampling and estimation-theoretic scheme.

Figure 10:
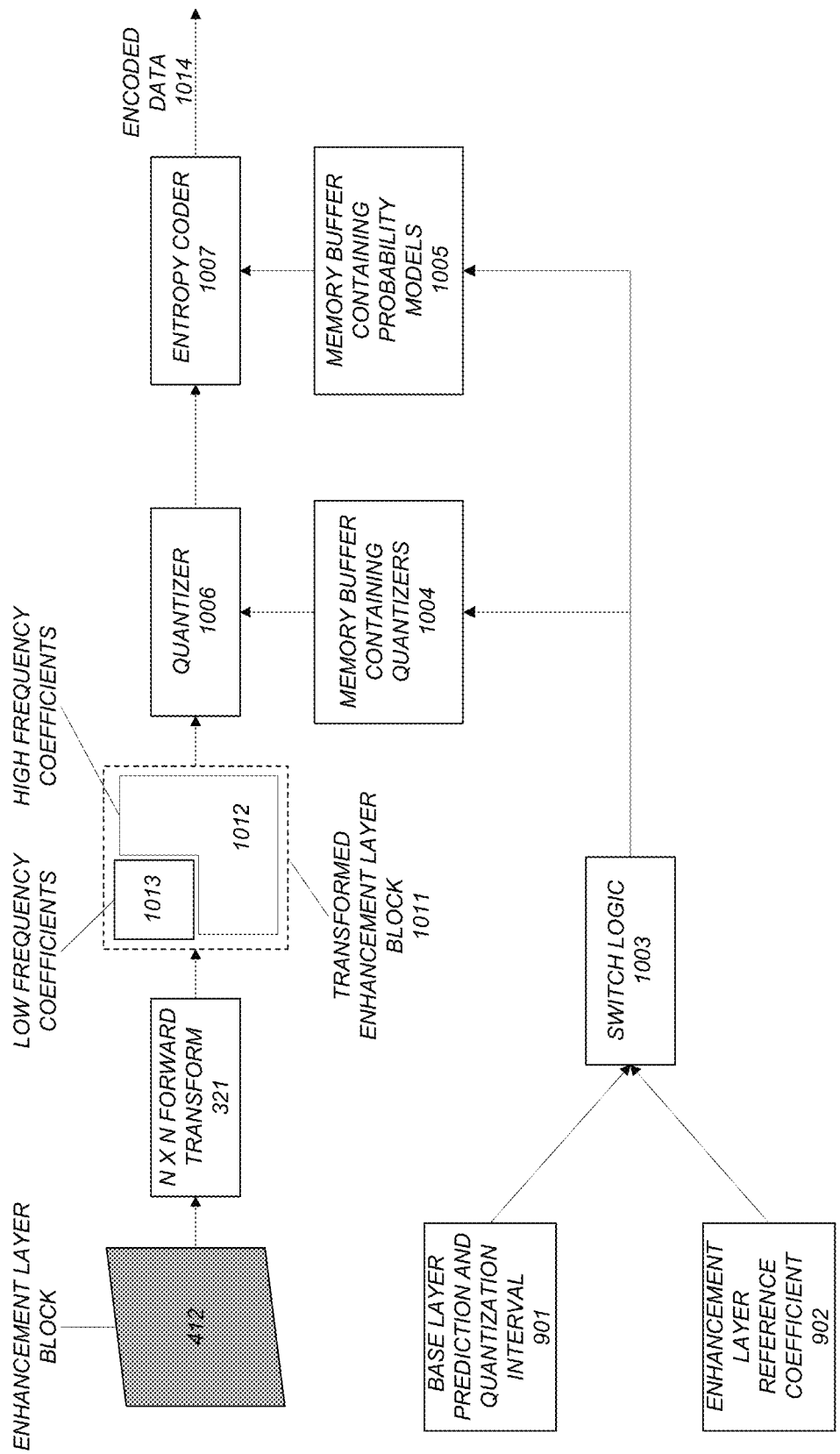
FIG. 10 illustrates an example system of the adaptive quantizer and entropy coding mechanism according to one or more embodiments of the invention.

FIG. 10 illustrates an example system of the adaptive quantizer and entropy coding mechanism according to one embodiment. The motion-compensated reference coefficient 902 is denoted by $\hat{x}_{n-1}^{e}(i, j)$. The interval determined by the base layer 901 denoted $I_n^e(i, j) = [a, b]$. The optimal N-level quantizer conditioned on $\hat{x}_{n-1}^{e}(i, j)$ and $I_n^e(i, j)$ can be obtained performing the following iterative procedure:

initialize $t_0 = a$ and $t_N = b$
repeat
$r_N \leftarrow c$
for $i = 1$ to $(N - 1)$ do $$r_i \leftarrow \frac{\int_{t_{i-1}}^{t_i} x_n \, p(x_n \mid \hat{x}_{n-1}^e, I_n^e)(dx)_n}{\int_{t_{i-1}}^{t_i} p(x_n \mid \hat{x}_{n-1}^e, I_n^e)(dx)_n}$$

$$P_i \leftarrow \int_{t_{i-1}}^{t_i} p(x_n \mid \hat{x}_{n-1}^e, I_n^e)(dx)_n$$

$$P_{i+1} \leftarrow \int_{t_i}^{t_{i+1}} p(x_n \mid \hat{x}_{n-1}^e, I_n^e)(dx)_n$$

$$t_i \leftarrow \frac{1}{2}(r_i + r_{i+1}) - \frac{\beta}{2} \frac{\log_2(P_{i+1}/P_i)}{r_{i+1} - r_i}$$

end for $$c \leftarrow \frac{\int_{t_{N-1}}^{t_N} x_n \, p(x_n \mid \hat{x}_{n-1}^e, I_n^e)(dx)_n}{\int_{t_{i-1}}^{t_i} p(x_n \mid \hat{x}_{n-1}^e, I_n^e)(dx)_n}$$

until $|c - r_N| < \epsilon$ where $p(x_n | \hat{x}_{n-1}^e, I_n^e)$ is given in (3). Given a positive integer N, one can obtain the desired N-level quantizer, specified by the partition determined by the decision points $\{t_i\}$ and by reconstruction values $\{r_i\}$. These quantizer structures can be pre-calculated and stored in buffer 1004. Corresponding probability models $\{P_i\}$ can be pre-calculated and stored in buffer 1005 for the subsequent entropy coding. In practice, it is possible that a few prototype quantizers, and the corresponding probability models for adaptive entropy coding can be stored in the buffer.

The switch logic 1003 sends a control signal to memory buffer 1004 to fetch an appropriate quantizer for the quantization process 1006, and a control signal to memory buffer 1005 to fetch an appropriate probability model for the entropy coding process 1007, depending on the base layer coding information 901 and enhancement layer motion-compensated reference 902.

The enhancement layer block 412 is transformed by an N×N forward transform 321. The resulting transform coefficient block 1011 comprises a set of high frequency coefficients 1012 and a set of low frequency coefficients 1013. The low frequency coefficients denoted by $\hat{x}_{n-1}^{e}(i, j)$, where i, j∈{0, . . . , M−1}, are quantized in 1006 using the quantizer fetched from buffer 1004 and the indexes are entropy coded in 1007 using the probability model fetched from buffer 1005. The high frequency coefficients 1012 are quantized using the conventional "dead-zone" quantizer, followed by the conventional spatially adaptive entropy coder. Alternatively joint probability distributions can be modeled and conditional vector quantizers can be designed. Note that the switch logic 1003 operates on the base layer coding information 901 and enhancement layer motion compensated reference 902, all of which are available exactly at the decoder. One embodiment of the invention comprises a decoder that can use the same switch logic to generate a prediction, and determine conditional quantizers and/or conditional entropy coders. In a preferred embodiment, these prediction, quantizers, and entropy coders are substantially the same as employed by a corresponding encoder that generated the bitstream processed by the decoder. The decoder may not need to compute information such as motion-vectors, or the prediction mode, which may be transmitted within the bitstream. Yet another embodiment of the invention comprises a decoder that generates a prediction using the switch logic, and employs it for error concealment, i.e., to conceal the effects of missing or corrupted encoded enhancement layer data, for example, due to packet loss in the network. The decoder of this embodiment enables enhanced resilience to loss in the network, even when a prior art encoder is in use, such as the H.264/SVC encoder.

Hardware Environment

Figure 11:
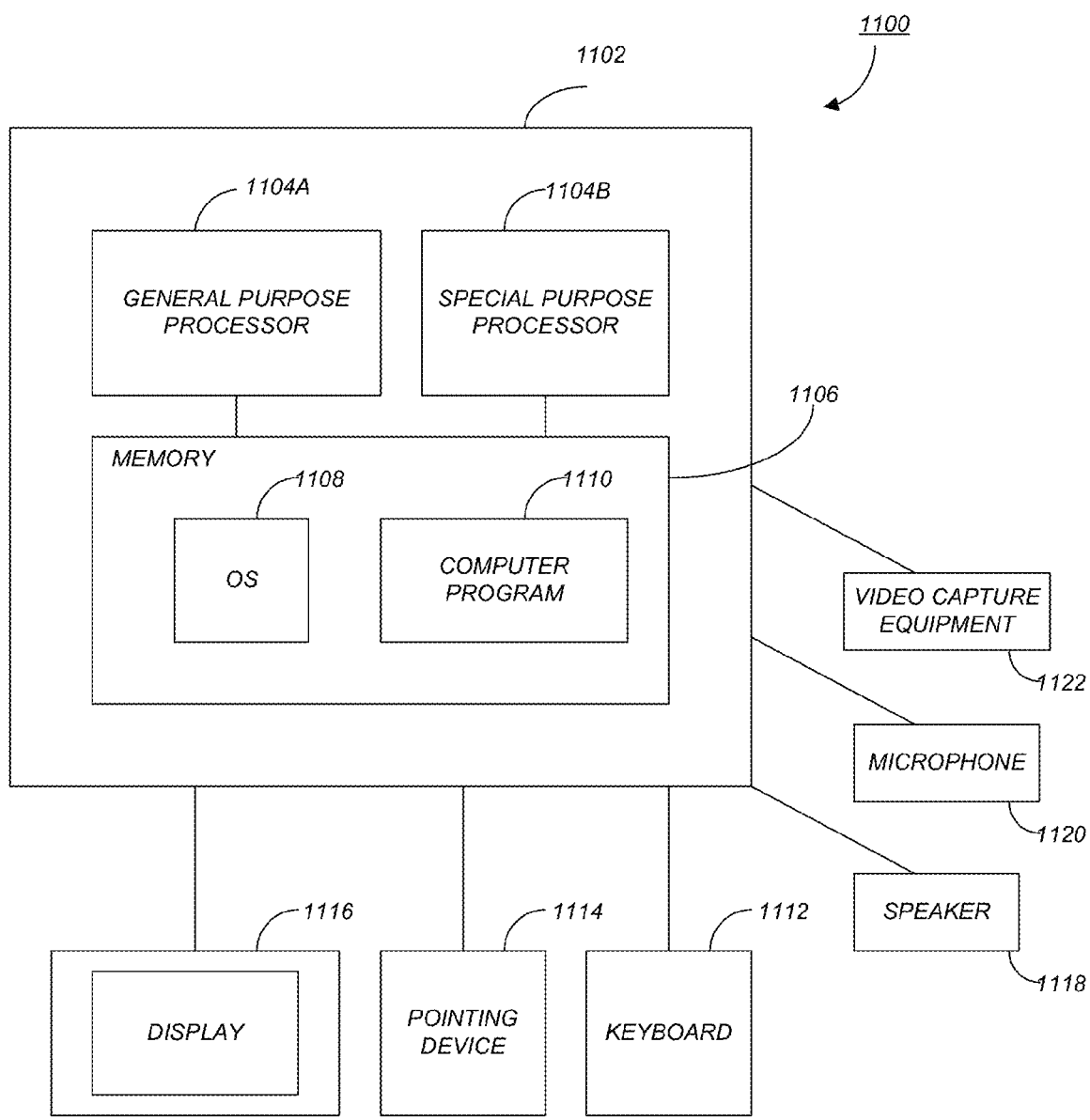
FIG. 11 is an exemplary hardware and software environment used to implement one or more embodiments of the invention.

FIG. 11 is an exemplary hardware and software environment 1100 used to implement one or more embodiments of the invention. The hardware and software environment includes a computer 1102 and may include peripherals. The computer 1102 comprises a general purpose hardware processor 1104A and/or a special purpose hardware processor 1104B (hereinafter alternatively collectively referred to as processor 1104) and a memory 1106, such as random access memory (RAM). The computer 1102 may be coupled to, and/or integrated with, other devices, including input/output (I/O) devices such as a keyboard 1112 and a cursor control device 1114 (e.g., a mouse, a pointing device, pen and tablet, touch screen, multi-touch device, etc.), a display 1116, a video capture equipment (such as a camera), a speaker 1118 (or multiple speakers or a headset) and a microphone 1120. In yet another embodiment, the computer 1102 may comprise a multi-touch device, mobile phone, gaming system, internet enabled television, television set top box, multimedia content delivery server, or other internet enabled device executing on various platforms and operating systems.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108, to provide output and results.

The unified resampling and estimation-theoretic prediction techniques may be performed within/by computer program 1110 and/or may be executed by processors 1104. Alternatively, or in addition, the transform domain downsampler, estimation-theoretic predictors, and the related components may be part of computer 1102 or accessed via computer 1102.

Output/results may be played back on video display 1116 or provided to another device for playback or further processing or action.

Some or all of the operations performed by the computer 1102 according to the computer program 1110 instructions may be implemented in a special purpose processor 1104B. In this embodiment, the some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program 1110 instructions. In one embodiment, the special purpose processor 1104B is an application specific integrated circuit (ASIC).

Of course, those skilled in the art will recognize that any combination of the above components, or any number of different components, peripherals, and other devices, may be used with the computer 1102.

Logical Flow

Figure 12:
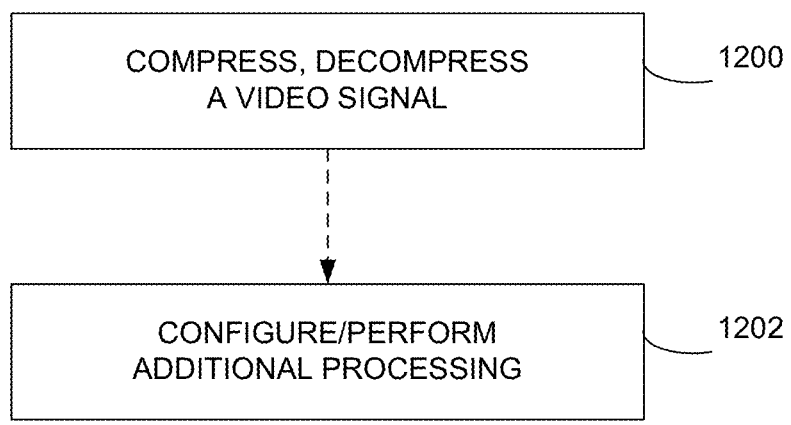
FIG. 12 illustrates the logical flow for processing a video signal in accordance with one or more embodiments of the invention.

FIG. 12 illustrates the logical flow for processing a video signal in accordance with one or more embodiments of the invention.

At step 1200, a video signal is compressed/decompressed in a scalable manner as described above. Step 1200 is performed utilizing a unified downsampling and estimation-theoretic prediction framework.

Specifically, step 1200 represents the processing of a video data stream comprised of a plurality of frames in a codec, wherein the codec comprises an encoder, a decoder, or both an encoder and a decoder. The encoder processes the video data stream to generate encoded data and the decoder processes the encoded data to reconstruct the video data stream. The encoded data is comprised of a base layer of lower spatial resolution and at least one enhancement layer of higher spatial resolution as compared to the base layer. The enhancement layer's encoding comprises transform-domain predictions, wherein predictions of one or more transform coefficients are made from the base layer's information on the transform coefficients in a current frame, and the enhancement layer's motion compensated information from one or more prior frames. The base layer's information may comprise bounds on the transform coefficients' values, wherein the bounds on the transform coefficients' values comprise specifications of intervals containing the transform coefficients' values. Alternatively, the base layer's information may comprise a probability distribution of the enhancement layer transform coefficients' values.

In implementing the present invention, step 1200 may include the following elements:

The predictions of the transform coefficients may employ conditional probability density functions, truncated by and normalized to the specifications of the intervals, to compute conditional expectations that form the transform coefficients' predictions for the enhancement layer.

The decoder may employ the transform domain predictions for concealment of loss of encoded enhancement layer data.

The predictions of the transform coefficients may be implemented as switched predictions, wherein switching of the switched predictions depends on the transform coefficients in the enhancement layer's reconstruction of a prior frame, and on the specifications of the intervals from the base layer.

The base layer's processing at the encoder may comprise down-sampling the current frame of the video data stream in the transform-domain by discarding high frequency transform coefficients in the base layer.

The transform-domain predictions of the transform coefficients may be obtained by implementing an optimal estimator of the transform coefficients given available information.

The predictions of the transform coefficients may employ a conditional probability density function, truncated by and normalized to a region defined by the bounds on the transform coefficients' values, to compute a conditional expectation that forms a prediction of the transform coefficients at the enhancement layer.

The enhancement layer's processing may employ an adaptive quantizer, an adaptive entropy coder, or both the adaptive quantizer and the adaptive entropy coder, which are adapted to the base layer's information on the transform coefficients in the current frame and the enhancement layer's motion compensated information from the prior frames.

The adaptive quantizer, the adaptive entropy coder, or both the adaptive quantizer and the adaptive entropy coder, may be further adapted to the base layer's information from one or more future frames.

The adaptive quantizer may comprise one or more partitioning rules that are adapted to one or more conditional probability density functions, truncated and normalized to a region defined by the bounds provided by the base layer's information.

The adaptive entropy coder may be adapted to a probability mass function computed from the conditional probability density functions and the partitioning rules.

The adaptive quantizer may be adaptively selected from a set of pre-designed prototype quantizers, depending on the base layer's information and the enhancement layer's motion compensated information.

The adaptive entropy coder and probability mass function may adaptively selected from a set of pre-designed prototype pairs, depending on the base layer's information and the enhancement layer's motion compensated information.

The predictions of the transform coefficients may utilize base layer's information from one or more future frames.

The encoder, the decoder, or both the encoder and the decoder, may decide to account for or ignore the base layer's information on the transform coefficients, in their predictions, depending on the base layer's coding mode.

When the base layer's information comprises a probability distribution of the enhancement layer transform coefficients' values, the predictions of the transform coefficients may be obtained by computing conditional expectations, and the conditional expectations combine probability distributions of the enhancement layer's transform coefficients obtained from the base layer and probability distributions of the enhancement layer's transform coefficients obtained from the prior frames.

At step 1202, further details regarding the compression/decompression of step 1200 are configured and/or performed. Such processing/configuring may include multiple aspects as described in detail above. For example, one or more model parameters of the Laplacian probability density function may be adapted to local video signal characteristics. Such parameters may be estimated from a reconstructed video signal. Such an adaptation may adjust model parameters for estimation-theoretic predictors. The adapting/adjusting may then be iterated until a desired level of performance (e.g., a minimum prediction error energy) is met. The parameters may be further adjusted to satisfy a perceptual criterion (e.g., gain parameters) may be further adjusted to satisfy a perceptual criterion that may be obtained by calculating a noise to mask ratio.

The compression of the video signal may include prediction, transformation, quantization, and entropy coding while the decompressing may include corresponding entropy decoding, prediction, dequantization, inverse transformation, and reconstruction. The prediction, quantization, entropy coding, and their inverse operations, may be utilized in an H.264/SVC system.

REFERENCES

The following references are incorporated by reference herein to the description and specification of the present application.

[1] H. Schwarz, D. Marpe, and T. Wiegand, "Overview of the scalable video coding extension of the H.264/AVC standard," IEEE Trans. Circuits and Systems for Video Technology, vol. 17, pp. 1103-1120, September 2007.

[2] C. A. Segall and G. J. Sullivan, "Spatial scalability within the H.264/AVC scalable video coding extension," IEEE Trans. Circuits and Systems for Video Technology, vol. 17, no. 9, pp. 1121-1135, September 2007.

[3] C. A. Segall and A. Katsaggelos, "Resampling for spatial scalability," Proc. IEEE ICIP, pp. 181-184, October 2006.

[4] R. Zhang and M. Comer, "Efficient inter-layer motion compensation for spatially scalable video coding," IEEE Trans. Circuits and Systems for Video Technology, vol. 18, pp. 1325-1334, October 2008.

[5] K. Rose and S. L. Regunathan, "Toward optimality in scalable predictive coding," IEEE Trans. Image Processing, vol. 10, no. 7, pp. 965-976, July 2001.

[6] J. Han, V. Melkote, and K. Rose, "Estimation-theoretic approach to delayed prediction in scalable video coding," Proc. IEEE ICIP, pp. 1289-1292, September 2010.

[7] J. Han, V. Melkote, and K. Rose, "A unified framework for spectral domain prediction and end-to-end distortion estimation in scalable video coding," Proc. IEEE ICIP, pp. 3278-3281, September 2011.

[8] J. Han, V. Melkote, and K. Rose, "An estimation-theoretic approach to spatially scalable video coding," Proc. IEEE ICASSP, March 2012.

[9] J. Han, V. Melkote, and K. Rose, "An estimation-theoretic framework for spatially scalable video coding with delayed prediction," Proc. Packet Video, May 2012.

[10] open source, http://www.webmproject.org/code/.

[11] D. Marpe et al., "Video compression using nested quadtree structures, leaf merging, and improved techniques for motion representation and entropy coding," IEEE Trans. Circuits and Systems for Video Technology, vol. 20, no. 12, pp. 1676-1687, December 2010.

[12] K. Rose, "Scalable predictive coding method and apparatus", U.S. Pat. No. 6,731,811 (2004).

[13] J. Han and K. Rose, "Approaching optimality in spatially scalable video coding: from resampling and prediction to quantization and entropy coding," Proc. IEEE ICIP, September 2013.

[14] F. Wu, S. Li, and Y.-Q. Zhang "A framework for efficient progressive fine granularity scalable video coding," IEEE Trans. Circuits and Systems for Video Technology, vol. 11, pp. 332-344, March 2001.

[15] H.-M. Hang and J.-J. Chen, "Source model for transform video coder and its application—Part I: fundamental theory," IEEE Trans. Image Proc., vol. 9, no. 10, pp. 1661-1666, October 2000.

CONCLUSION

In conclusion, embodiments of the present invention provide an efficient and effective solution to the problem of spatially scalable video compression. The solution involves a unified estimation-theoretic framework of resampling, prediction, quantization, and entropy coding, which by design is tailored to enable the base layer coding information fully accessible and usable by the enhancement layer; and to enable the enhancement layer to account for all available information from both base and enhancement layers for superior compression performance. Embodiments of the invention complement this framework with a design method to provide a low-complexity variant for hardware implementation. The effectiveness of such approaches has been demonstrated for various commercially used systems and standards, such as video storage and transmission, and the H.264/SVC standard.

Accordingly, embodiments of the invention enable performance improvement in various video related applications, including for example, video storage and distribution (e.g., Netflix streaming), as well as high efficiency storage and playback devices, wireless video streaming (especially to scenarios that involve streaming service to multiple devices at differing display resolution), and high-definition teleconferencing (including on smart phones and tablets). Embodiments of the invention may also be utilized in areas/products that involve video storage and/or transmission at various spatial resolutions and/or quality (SNR) resolutions. Further embodiments may also be utilized in multimedia applications that utilize cloud based content distribution services.

In view of the above, embodiments of the present invention disclose methods and devices for signal estimation/prediction, quantization and entropy coding.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the invention and the following claims, and the full range of equivalents of the claims.

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the full range of equivalents of the claims. The attached claims are presented merely as one aspect of the present invention. The Applicant does not disclaim any claim scope of the present invention through the inclusion of this or any other claim language that is presented or may be presented in the future. Any disclaimers, expressed or implied, made during prosecution of the present application regarding these or other changes are hereby rescinded for at least the reason of recapturing any potential disclaimed claim scope affected by these changes during prosecution of this and any related applications. Applicant reserves the right to file broader claims in one or more continuation or divisional applications in accordance within the full breadth of disclosure, and the full range of doctrine of equivalents of the disclosure, as recited in the original specification.

What is claimed is:

1. An apparatus for processing a video data stream, comprising:
   a codec for processing a video data stream comprised of a plurality of frames, wherein the codec comprises an encoder, a decoder, or both an encoder and a decoder;
   the encoder processes a video data stream to generate encoded data and the decoder processes encoded data to reconstruct a video data stream;
   the encoded data is comprised of a base layer of lower spatial resolution and at least one enhancement layer of higher spatial resolution as compared to the base layer; and
   the enhancement layer's processing comprises transform domain predictions, wherein predictions of one or more transform coefficients are made from the base layer's information on the transform coefficients in a current frame, and the enhancement layer's motion compensated information from one or more prior frames;
   wherein the base layer's information comprises bounds on the transform coefficients' values; and
   wherein the base layer's processing at the encoder comprises down-sampling the current frame of the video data stream in the transform domain by discarding high frequency transform coefficients in the base layer.

2. The apparatus of claim 1, wherein the bounds on the transform coefficients' values comprise specifications of intervals containing the transform coefficients' values.

3. The apparatus of claim 2, wherein the predictions of the transform coefficients employ conditional probability density functions, truncated by and normalized to the specifications of the intervals, to compute conditional expectations that form the transform coefficients' predictions for the enhancement layer.

4. The apparatus of claim 3, wherein the decoder employs the transform domain predictions for concealment of loss of encoded enhancement layer data.

5. The apparatus of claim 2, wherein the predictions of the transform coefficients are implemented as switched predictions, and switching of the switched predictions depends on the transform coefficients in the enhancement layer's reconstruction of a prior frame, and on the specifications of the intervals from the base layer.

6. The apparatus of claim 5, wherein the decoder employs the transform domain predictions for concealment of loss of encoded enhancement layer data.

7. The apparatus of claim 1, wherein the transform domain predictions of the transform coefficients are obtained by implementing an optimal estimator of the transform coefficients given available information.

8. The apparatus of claim 1, wherein the predictions of the transform coefficients employ a conditional probability density function, truncated by and normalized to a region defined by the bounds on the transform coefficients' values, to compute a conditional expectation that forms a prediction of the transform coefficients at the enhancement layer.

9. The apparatus of claim 1, wherein the enhancement layer's processing employs an adaptive quantizer, an adaptive entropy coder, or both the adaptive quantizer and the adaptive entropy coder, which are adapted to the base layer's information on the transform coefficients in the current frame and the enhancement layer's motion compensated information from the prior frames.

10. The apparatus of claim 9, wherein the adaptive quantizer, the adaptive entropy coder, or both the adaptive quantizer and the adaptive entropy coder, are further adapted to the base layer's information from one or more future frames.

11. The apparatus of claim 9, wherein the adaptive quantizer comprises one or more partitioning rules that are adapted to one or more conditional probability density functions, truncated and normalized to a region defined by the bounds provided by the base layer's information.

12. The apparatus of claim 11, wherein the adaptive entropy coder is adapted to a probability mass function computed from the conditional probability density functions and the partitioning rules.

13. The apparatus of claim 9, wherein the adaptive quantizer is adaptively selected from a set of pre-designed prototype quantizers, depending on the base layer's information and the enhancement layer's motion compensated information.

14. The apparatus of claim 9, wherein the adaptive entropy coder and probability mass function are adaptively selected from a set of pre-designed prototype pairs, depending on the base layer's information and the enhancement layer's motion compensated information.

15. The apparatus of claim 1, wherein the predictions of the transform coefficients further utilize base layer's information from one or more future frames.

16. The apparatus of claim 15, wherein the decoder employs the transform domain predictions for concealment of loss of encoded enhancement layer data.

17. The apparatus of claim 1, wherein the encoder, the decoder, or both the encoder and the decoder, decide to account for or ignore the base layer's information on the transform coefficients, in their predictions, depending on the base layer's coding mode.

18. The apparatus of claim 1, wherein the decoder employs the transform domain predictions for concealment of loss of encoded enhancement layer data.

19. An apparatus for processing a video data stream, comprising:
a codec for processing a video data stream comprised of a plurality of frames, wherein the codec comprises an encoder, a decoder, or both an encoder and a decoder;
the encoder processes a video data stream to generate encoded data and the decoder processes encoded data to reconstruct a video data stream;
the encoded data is comprised of a base layer of lower spatial resolution and at least one enhancement layer of higher spatial resolution as compared to the base layer; and
the enhancement layer's processing comprises transform domain predictions, wherein predictions of one or more transform coefficients are made from the base layer's information on the transform coefficients in a current frame, and the enhancement layer's motion compensated information from one or more prior frames;
wherein the base layer's information comprises a probability distribution of the enhancement layer transform coefficients' values; and
wherein the base layer's processing at the encoder comprises down-sampling the current frame of the video data stream in the transform domain by discarding high frequency transform coefficients in the base layer.

20. The apparatus of claim 19, wherein the predictions of the transform coefficients are obtained by computing conditional expectations, and the conditional expectations combine probability distributions of the enhancement layer's transform coefficients obtained from the base layer and probability distributions of the enhancement layer's transform coefficients obtained from the prior frames.

21. A method of processing a video data stream, comprising:
processing a video data stream comprised of a plurality of frames in a codec, wherein the codec comprises an encoder, a decoder, or both an encoder and a decoder;
the encoder processes a video data stream to generate encoded data and the decoder processes encoded data to reconstruct a video data stream;
the encoded data is comprised of a base layer of lower spatial resolution and at least one enhancement layer of higher spatial resolution as compared to the base layer; and
the enhancement layer's processing comprises transform domain predictions, wherein predictions of one or more transform coefficients are made from the base layer's information on the transform coefficients in a current frame, and the enhancement layer's motion compensated information from one or more prior frames;
wherein the base layer's information comprises bounds on the transform coefficients' values; and
wherein the base layer's processing at the encoder comprises down-sampling the current frame of the video data stream in the transform domain by discarding high frequency transform coefficients in the base layer.

22. The method of claim 21, wherein the bounds on the transform coefficients' values comprise specifications of intervals containing the transform coefficients' values.

23. The method of claim 22, wherein the predictions of the transform coefficients employ conditional probability density functions, truncated by and normalized to the specifications of the intervals, to compute conditional expectations that form the transform coefficients' predictions for the enhancement layer.

24. The method of claim 23, wherein the decoder employs the transform domain predictions for concealment of loss of encoded enhancement layer data.

25. The method of claim 22, wherein the predictions of the transform coefficients are implemented as switched predictions, and switching of the switched predictions depends on the transform coefficients in the enhancement layer's reconstruction of a prior frame, and on the specifications of the intervals from the base layer.

26. The method of claim 25, wherein the decoder employs the transform domain predictions for concealment of loss of encoded enhancement layer data.

27. The method of claim 21, wherein the transform domain predictions of the transform coefficients are obtained by implementing an optimal estimator of the transform coefficients given available information.

28. The method of claim 21, wherein the predictions of the transform coefficients employ a conditional probability density function, truncated by and normalized to a region defined by the bounds on the transform coefficients' values, to compute a conditional expectation that forms a prediction of the transform coefficients at the enhancement layer.

29. The method of claim 21, wherein the enhancement layer's processing employs an adaptive quantizer, an adaptive entropy coder, or both the adaptive quantizer and the adaptive entropy coder, which are adapted to the base layer's information on the transform coefficients in the current frame and the enhancement layer's motion compensated information from the prior frames.

30. The method of claim 29, wherein the adaptive quantizer, the adaptive entropy coder, or both the adaptive quantizer and the adaptive entropy coder, are further adapted to the base layer's information from one or more future frames.

31. The method of claim 29, wherein the adaptive quantizer comprises one or more partitioning rules that are adapted to one or more conditional probability density functions, truncated and normalized to a region defined by the bounds provided by the base layer's information.

32. The method of claim 31, wherein the adaptive entropy coder is adapted to a probability mass function computed from the conditional probability density functions and the partitioning rules.

33. The method of claim 29, wherein the adaptive quantizer is adaptively selected from a set of pre-designed prototype quantizers, depending on the base layer's information and the enhancement layer's motion compensated information.

34. The method of claim 29, wherein the adaptive entropy coder and probability mass function are adaptively selected from a set of pre-designed prototype pairs, depending on the base layer's information and the enhancement layer's motion compensated information.

35. The method of claim 21, wherein the predictions of the transform coefficients further utilize base layer's information from one or more future frames.

36. The method of claim 35, wherein the decoder employs the transform domain predictions for concealment of loss of encoded enhancement layer data.

37. The method of claim 21, wherein the encoder, the decoder, or both the encoder and the decoder, decide to account for or ignore the base layer's information on the transform coefficients, in their predictions, depending on the base layer's coding mode.

38. The method of claim 21, wherein the decoder employs the transform domain predictions for concealment of loss of encoded enhancement layer data.

39. A method of processing a video data stream, comprising:

processing a video data stream comprised of a plurality of frames in a codec, wherein the codec comprises an encoder, a decoder, or both an encoder and a decoder;

the encoder processes a video data stream to generate encoded data and the decoder processes encoded data to reconstruct a video data stream;

the encoded data is comprised of a base layer of lower spatial resolution and at least one enhancement layer of higher spatial resolution as compared to the base layer; and the enhancement layer's processing comprises transform domain predictions, wherein predictions of one or more transform coefficients are made from the base layer's information on the transform coefficients in a current frame, and the enhancement layer's motion compensated information from one or more prior frames;

wherein the base layer's information comprises a probability distribution of the enhancement layer transform coefficients' values; and wherein the base layer's processing at the encoder comprises down-sampling the current frame of the video data stream in the transform domain by discarding high frequency transform coefficients in the base layer.

40. The method of claim 39, wherein the predictions of the transform coefficients are obtained by computing conditional expectations, and the conditional expectations combine probability distributions of the enhancement layer's transform coefficients obtained from the base layer and probability distributions of the enhancement layer's transform coefficients obtained from the prior frames.

* * * * *